US008072637B2

(12) United States Patent
Freeny, Jr.

(10) Patent No.: US 8,072,637 B2
(45) Date of Patent: *Dec. 6, 2011

(54) MULTIPLE INTEGRATED MACHINE SYSTEM

(75) Inventor: Charles C. Freeny, Jr., Grand Prairie, TX (US)

(73) Assignee: Automated Business Companies, Sprint, TX (US)

( * ) Notice: Subject to any disclaimer, the term of this patent is extended or adjusted under 35 U.S.C. 154(b) by 640 days.

This patent is subject to a terminal disclaimer.

(21) Appl. No.: 11/943,291

(22) Filed: Nov. 20, 2007

(65) Prior Publication Data

US 2008/0068652 A1    Mar. 20, 2008

Related U.S. Application Data

(63) Continuation of application No. 10/967,854, filed on Oct. 18, 2004, now Pat. No. 7,301,664, which is a continuation of application No. 09/472,712, filed on Dec. 24, 1999, now Pat. No. 6,806,977.

(60) Provisional application No. 60/114,594, filed on Dec. 31, 1998.

(51) Int. Cl.
*G06K 15/00*    (2006.01)

(52) U.S. Cl. ... 358/1.15; 358/402; 348/552; 379/102.03

(58) Field of Classification Search .................. 358/1.15, 358/402; 379/102.03, 100.01, 100.06, 100.08, 379/100.02; 348/552

See application file for complete search history.

(56) References Cited

U.S. PATENT DOCUMENTS 4,674,044 A    6/1987    Kalmus et al.
(Continued)

FOREIGN PATENT DOCUMENTS

EP    0 401 203 A2    5/1990
(Continued)

OTHER PUBLICATIONS

"Wireless Trading—Schwab cuts the electronic cord with PocketBroker(™) and Palm(™)"; Schwab Active Trader; On Investing, Summer 2000; AT5-AT6, Sep. 2000.

(Continued)

*Primary Examiner* — Jerome Grant, II
(74) *Attorney, Agent, or Firm* — Dunlap Codding, P.C.

(57) ABSTRACT

A multiple integrated machine system (hereafter referred to as "MIMS") capable of performing as at least two or more digital machines. The MIMS comprises two or more digital machine elements controlled by the same operating system software. Each of the digital machine elements includes hardware portions and software portions and each digital machine element is capable of performing as part of one of the digital machines. Each of the digital machine elements is different. A digital machine element grouping control unit is also provided. The digital machine element grouping control unit automatically and operatively connects predetermined digital machine elements in a first combination to form a first digital machine upon receipt of a first digital machine selection, and automatically and operatively connects predetermined digital machine elements in a second combination to form a second digital machine upon receipt of a second digital machine selection. The first combination of predetermined digital machine elements is different from the second combination of digital machine elements. A plurality of subgroup function control units are provided with each subgroup function control unit being associated with one of the first digital machine and the second digital machine for selecting for use one or more function modes to be performed by the first digital machine and the second digital machine. Four different types of MIMS (a desktop MIMS, a kiosk MIMS, a mobile MIMS and a hospitality MIMS) are disclosed herein with the multiple digital machines in each type of MIMS being selectable for different functional purposes.

8 Claims, 14 Drawing Sheets

U.S. PATENT DOCUMENTS

| | | | |
|---|---|---|---|
| 5,033,804 A | | 7/1991 | Faris |
| 5,758,081 A | * | 5/1998 | Aytac .......................... 709/212 |
| 5,758,324 A | | 5/1998 | Hartman et al. |
| 5,802,314 A | | 9/1998 | Tullis et al. |
| 6,490,051 B1 | | 12/2002 | Nguyen |
| 6,806,977 B1 | * | 10/2004 | Freeny et al. ................ 358/1.15 |
| 2002/0012453 A1 | | 1/2002 | Hashimoto et al. |
| 2002/0063872 A1 | | 5/2002 | Ouchi |

FOREIGN PATENT DOCUMENTS

| | | |
|---|---|---|
| WO | WO 95/26005 | 9/1995 |
| WO | WO 97/22075 | 6/1997 |

OTHER PUBLICATIONS

CyberCorp—the leading edge of active-trading technology joins The Charles Schwab Corporation; Schwab Active Trader; On Investing, Summer 2000; AT7, Sep. 2000.

"Briefings—Quick tips to help you use Schwab more effectively"; Schwab Active Trader; On Investing; Summer 2000; p. 52, Sep. 2000.

"The Qualcomm pdQ: Kill two birds with one phone", Dec. 3, 1999, www.edition.cnn.com/1999/TECH/ptech/12/03/qualcomm.pdg/.

"Fax machine, R.I.P?"; Forbes magazine, Jul. 5, 1999; p. 136.

* cited by examiner

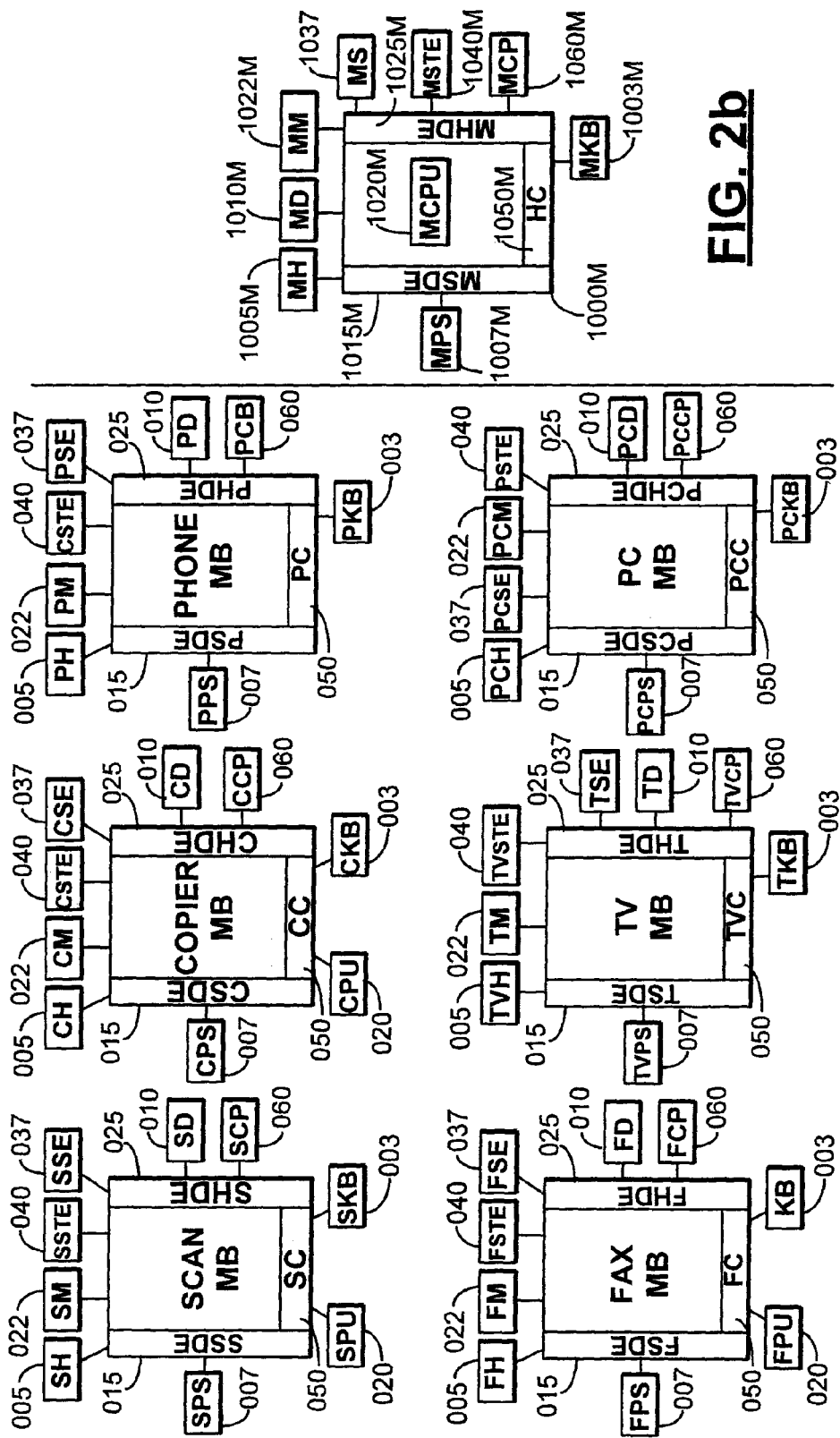

MULTIPLE INTEGRATED MACHINE SYSTEM

CROSS-REFERENCE TO RELATED APPLICATIONS

This application is a continuation of U.S. Ser. No. 10/967,854, filed Oct. 18, 2004 now U.S. Pat. No. 7,301,664, which is a continuation of U.S. Ser. No. 09/472,712 filed Dec. 24, 1999, now U.S. Pat. No. 6,806,977, issued on Oct. 19, 2004; which claims priority to the provisional patent application identified by U.S. Ser. No. 60/114,594, filed on Dec. 31, 1998, the entire contents of both applications are hereby expressly incorporated herein by reference.

STATEMENT REGARDING FEDERALLY SPONSORED RESEARCH OR DEVELOPMENT

Not applicable.

BACKGROUND OF THE INVENTION

In the last five years there has been an explosion of useful digital information machines (Phones, Fax, Printers, Scanners, CDROMS, Digital cameras, Pagers, Pocket computers, digital sound systems, etc) many of which were originally analog digital machines. In most cases these digital machines have been connected to PC digital machine systems using industry hardware and software connection standards. During this same period, the explosion of the Internet has made the Internet Service Provider (ISP) with E-mail service a common (and in many cases preferred) form of message communication. Technology developed to handle the Internet/WWW/E-mail servers (i.e. Software such as HTML and JAVA) are being combined with the object oriented application developer software (e.g. C++, Visual Basic, Pearl) to solve both the company Intranet PC digital machine Network connection problems, and digital information digital machine integration problems.

Two basic approaches to integrating these digital information digital machines with the PC digital machine and integrating the PC digital machine into the worldwide communication networks have evolved. One will be referred to as the "Client/Server" approach, and the other, the "All in One" digital machine approach. A notable client/server approach is the one developed by Microsoft, who maintains the operating system for most PC digital machine's in use today. The Microsoft approach is one that requires every new digital machine recently being referred to as "digital appliances" to "Plug" into a PC digital machine (or network) and "play" for those persons who are allowed to operate that PC digital machine or network (referred to as "Plug and Play"). The client/server approach works good for sharing company database resources such as an Airline Ticketing worldwide network with many Travel Agents needing to access a common database. The approach also has some merit if very expensive resources such as specialty printers in a printing company need to be shared or maybe in the wireless network home environment when used to share resources not requiring operator interaction. But the client/server approach has not worked well when trying to integrate the many new digital information digital machines into user friendly Information systems practical for most individuals at home or office. The Client/Server approach requires a software element compatible and approved by Microsoft, for every new digital machine, which is to be connected to a PC digital machine or PC digital machine network system running under one of Microsoft's operating systems for example. This software element is of course in addition to the hardware and software elements which the digital machine manufacture already designed to make the digital machine operate without being connected to a PC digital machine.

As noted earlier Client/Server systems certainly have their role in connecting large company resources together and sharing expensive information digital machine subsystems such as printers, faxes, scanners, modems, backup units, and large company databases with many employees. The complexity for this type system along with the computer specialist required to operate them are in many cases worth the increased software, cabling, and employee training cost, when data integrity and information value to a large company is considered.

However the need for a much simpler user friendly digital machine integration approach in general has led to the popular "All in One" multiple function digital machines such as the HP 3100, 1170C, and 1175C whereby faxing, printing, scanning, and copying are done with a single housing digital machine. The more advanced "All in One" or Multifunction digital machines as they are technically known when connected to a separate PC digital machine or PC digital machine network will even let scanned documents be sent to E-mail addresses. It is this "All in One" integration which is considered a better approach for the individual, and the Small Office Home Office (SOHO) market. Another, even newer, digital information communication digital machine is the Web TV unit designed to make Web site access and E-mail retrieval (ISP access) much easier for the Home. Both of these digital machine design approaches have moved away from PC digital machine dependence, except where it is most convenient for the digital machine designer. For example in the current "All in One" digital machines a parallel printer connection to the digital machine is made so that the PC digital machine word processor can (must) be used for typing the information. The PC data is sent to be printed by the "All in One" digital machine. The same connector is also used to send scanned document data back to the PC digital machine storage unit, etc. Another very important example is that, currently, the individuals PC digital machine (or network server) must be used to send and receive documents between other PC digital machine's, Internet E-mail, or web sites. This is because even the so called "All in One" digital machines which are really single multiple function digital machines cannot in most cases even perform there multiple functions in a standalone configuration (note the HP Digital 9100C Sender or the Ricoh Fax 4800L shown at the 1998 Comdex show). Thus the current situation requires that several digital information digital machines be connected together using interface requirements produced by at least three separate industries in order to produce a larger information system. These three industries are the Communication Industry, the PC digital machine Industry (the youngest of the three), and the Peripheral Digital machine Industry. Also the youngest of the three currently has the integration responsibility of making larger and more useful information systems by connecting the smaller digital machines together. The current complexity explosion is very akin to the electronic era complexity explosion that finally abated with the advent of the integrated circuit. Then, the electronics industry manpower requirements started growing exponentially when Radio's, TV's, computers, and all Military electronic digital machines were being built by individually connecting Transistors, Resistors, Capacitors, Inductors, together according to Industry and individual company interface specifications. Today we find a similar situation in the manpower explosion for, Certified PC and Network technicians along with application programmers. Ironically it is growing for a reason similar to the growth in the electronic era mentioned plus one additional reason. The similar reason is that the PC digital machine technology explosion spread to the Peripheral Digital machine Manufacturers and the method to connect all of these digital machines together was never the responsibility of any one manufacture. Thus, connection standards between digital machines were adopted (e.g. RS232, RJ11, LPT1, BCN, WIN98, and many more) and expanded to include software and communication interface requirements such as HTML 3.2 until now a company information system may have 50 to 100 digital machines connected together by no less than 500 to 10,000 interface elements (counting software elements).

The additional reason for the complexity explosion is that the PC digital machine industry (the youngest of the three industries mentioned earlier) developed so rapidly that three additional separate industries where spawned. Also, none of the three new industries were responsible for integrating the smaller digital machines into user friendly information systems. One of the three new industries built the computers, another built the computer operating system and the third wrote application programs to make the computer fulfill more tasks. At present all three of these industries are concerned about the multiple digital machine explosion and offer various integration solutions of which the most notable, (Client/Server) was discussed earlier. Ironically, while this invention was being developed the three new industries groups along with the two older industry groups and the Federal Government were arguing about each infringing on the others territory.

The design approach taken in this invention will most likely move the integration task to either the computer manufacture or the peripheral digital machine Manufacture. The design presented herein is an integration method to incorporate multiple digital information digital machines of which each previously required a connection to a PC digital machine located in a separate housing, to be able to operate from a single digital machine. The method involves moving the elements (both hardware and software) of several digital information digital machines into a single housing, sharing these hardware and software elements in such a manner that an individual can select a useful digital machine from a simple list of available digital machines. For example, such a design would allow a PC digital machine plus an "All in One" office digital machine to be combined into a single MIMS housing with a digital machine selector switch having two choices. When the PC digital machine is selected, users can use the MIMS as a PC digital machine with built in "All in One" features (note that such a digital machine is not currently available). When the Office digital machine is selected, users can use the MIMS as an "All in One" digital machine with built in PC digital machine features (note that such a digital machine is currently not available). In the future a PC digital machine selection switch will probably not be available on most companies MIMS (the leading cause of wasted man-hours is employee use of the company PC digital machine for personal matters). Also things like PC digital machine viruses, hackers, etc, will be virtually eliminated when the company PC digital machine and client/server workstations are incorporated into MIMS workstations. Important to the manufacture is that, they can now build proprietary and less expensive hardware and software elements for the various functions to be preformed in each of the digital machine stand alone modes. It is this key integration step that makes the MIMS design approach so radically different (exactly opposite in approach) from the Client/Server approach discussed earlier. The steps taken in this invention removes most user inconveniences of the information systems on the market today by having the conventional PC digital machine be invisible unless the PC digital machine can be selected from the MIMS model purchased. Requiring the PC digital machine, Client/Server, Programming and Digital "All in One" digital machine Designs to share a single housing provides a much healthier Information Systems growth environment. Such a design approach could do for the information age what the integrated circuit did for the electronic age. It requires the application programmers to work much more closely with the digital machine manufacture designers. This will even become true of the PC digital machine game industry in the future when a MIMS Game digital machine will be added to the home MIMS digital machine to provide a simple flexible, fun digital machine for both adult and children to play games without having to be PC digital machine literate.

The concept of combining several digital machines into the same housing system is not claimed in this invention. The method to combine and share both the software and hardware elements of several digital information digital machines in the same housing system along with selection controls to have more features after integration than before (i.e. functional synergism) is claimed in this invention. There are numerous examples of combining several digital machines in the same housing such as home centers which incorporate TV, Radio, VCR into a single housing. The "All in One" multiple function digital machine was discussed earlier as an example of combining elements in the same housing with a function selector switch to create a multiple function digital machine. However the method of combining elements from multiple digital machines in the same housings in a manner that several digital machines can be selected and in a manner that each selected digital machine has multiple functions has not been done nor has it been done in the manner described herein. Two other earlier digital information digital machines directed at simplifying the process for individuals and businesses where invented by the current author. The Point of Sale Information Manufacturing Digital machine (POSIMM) was invented in the early 1980's, U.S. Pat. No. 4,528,643 and the first modern electronic message unit was invented in the late 1980's U.S. Pat. No. 4,837,797. Since then and especially in the last three years there have been many improvements in these digital machines. One digital machine (Trade name "Touch Net" usually found in airports and malls) for copy and fax service has a simple touch command screen to sell these services. They recently expanded the digital machine functions to include Internet access along with local merchant information services. The "Touch Net" retail digital machine along with the Card, Music, and similar Information Kiosk's located in Drug stores and Malls are covered by the '643 POSIMM patent and are good examples of single digital multifunction information digital machine that work. Another class of single digital information multiple function digital machines that work well are the retail Franchise digital machines (Macdonald, Burger King, Kroger, Jiffy Lube, etc) which utilize a touch command digital machine to operate the company retail store. Most all of these multiple function digital machines are operated by persons not PC digital machine literate.

An example of a single digital multifunction information digital machine that is very impractical to operate is a PC digital machine running windows95/98. Very few people can operate the digital machine and most do not try because of the digital machine complexity. Furthermore the digital machine can perform almost no useful functions unless it is connected to other digital machines and additional software elements are added, a very striking example of the industries fragmentation.

Internet communication systems for generating information have surfaced which will eventually greatly increase the productivity of the individual at the office and home. A significant one in terms of the need for a MIMS is the interactive Web site covered by U.S. Pat. No. 5,694,162. Interactive Web sites puts the consumer in direct contact with the information or product manufacture. The '162 patent allows all companies (or individuals) to have both low cost advertising and direct sales from a single Broadcast station located on the WWW. The Web Site technology is causing vast information databases to be created along with virtual stores selling information and other products worldwide. The need for a MIMS that includes an Internet Digital machine with the features being incorporated into the current Web TV set top boxes is already apparent. Because of the industry fragmentation, the proliferation of application programs being developed to turn a PC digital machine into a useful digital machine for daily tasks are expanding geometrically (excluding PC digital machine game applications). This current situation occurred in less than 10 years and has led to astounding user choice chaos. By way of example, there are no less than 20 software programs designed to turn a PC digital machine into a message or communication center (e.g. Communicate! PRO is one such PC digital machine program). Each of them has at least four modes (multifunction ability) such as a, Phone, Pager, E-mail, and Fax mode. In addition each of the 20 programs must be made to work on the individuals PC digital machine which is no simple task with the proliferation of PC digital machine models and software operating systems. Thus 20 programs each with 4 functions to learn and say 10 PC digital machine configurations (counting portables) require a user knowledge base of 20×4×10=800 sets of procedures.

These are associated with just one type of useful digital multifunction information digital machine where a PC digital machine is used to integrate the 20 software elements into the digital machine. Expanding the above example to say at least 30 good multifunctional digital machines being required in today's world and each with 3 price models leads to 72,000 sets of procedures in the current approach of letting the PC digital machine be the primary integration digital machine. But it gets worse, the requirement that multiple digital machines be connected to the PC digital machine in order to have useful information digital machine for home and office further compounds the present situation. The other connected digital machines such as, printers, Faxes, copiers, scanners; ISP's yield another multiplier of say 10 (type digital machines)×6 (manufactures for each digital machine) which is 60. Thus we are talking at a minimum of 60×72000, or over four million sets of procedures cast upon today's user with the current design approach. Such and approach has clearly created To Many Digital machines (TMM) and To Much Information (TMI) for even the very PC digital machine literate to master. Considering that only a few percent of the working population are or will be PC digital machine literate indicates why single digital information digital machines like the "All in One" and Web TV will be the only practical solution (i.e. digital machine integration must happen just like circuit integration happened before). It also shows why the De-coupling of programmers from digital machine designers over the last ten years has led to choice chaos.

The MIMS design approach advocates solving the TMM/TMI problem by combining the many single digital information digital machines into only a few single housing Multi-digital machines where each digital machine has multiple function or subgroup modes and where each mode has several useful functions. For example let the 30 single multifunction digital machines used in the earlier example be incorporated into say 5 MIMS digital machines (and average of six information digital machines per MIMS). Let these be made by say 6 major manufacturers, each with a low cost medium cost and high cost version (3 price models as before). Then only 6×3×5=90 MIMS would have to be understood by the professionals and probably no more than 10 for the average individual (Military versions would clearly have some special digital machine modes). Again, letting each of the 6 MIMS digital machines selected have 4 functions gives a maximum set of 360 operational procedures to be digested instead of over four million.

Note that the first example is very close to representing the current TMM/TMI situation. A dependence on a digital machine integration approach developed by programmers rather than digital machine manufacturers is clearly leading to a situation akin to the electronics industry complexity explosion prior to the integrated circuit. Also remembering Mainframe Computer Technology dependence lessons (the early form of client/server systems) should be enough, to remind us to keep new digital machine integration simple for the user and independent of computer administrators. Especially when integrating the new Internet Service Provider (ISP) communication protocols and document formats into user friendly systems.

This is not to say that a MIMS digital machine should not have the ability to have a PC digital machine selection and connect to networks. It is to say, trying to extend the PC digital machine beyond its useful 4 to 10 functions (note that this is a well known limit in humans for any digital machine) such as, accounting, spread sheets, database mining, Word processing, calculator, etc using application programmers with no digital machine constraints has led to massive TMM/TMI for both companies and individuals.

The Client/Server (C/S) solutions being created today by companies such as Microsoft, Sun Microsystems, Cisco for example, is like re-creating the old mainframe departments and programmers that went along with renaissance mainframes. Today the TMM/TMI problem is creating the IT, Webmaster, Certified Technician, to deal with the more than 4,000,000 sets of procedures illustrated in the earlier example. The C/S approach is practical to solve large database and communication infrastructure problems, but should stay invisible to the individual who has the day to day responsibility of operating the company and personal information digital machines. The office and home Information Digital machines of the future should be very simple to operate and not require PC digital machine literacy for most routine daily tasks.

In summary, there currently is not a multiple digital machine integration approach to combine the shareable elements in PC digital machines, office digital machines, multimedia digital machines, communication digital machines, ISP digital machines, and the many Peripheral digital machines, into several simpler digital machine systems for the convenience of the company or individual. That is, a need exists for a simple MIMS, by which a person can perform most of one's daily personal and business tasks simply and conveniently without having to be PC digital machine literate. Currently a user is required to operate a PC digital machine connected to many other digital machines often located in remote locations in order to perform most of the daily functions required. The invention herein is referred to as the "MIMS" approach to distinguish it from the prior art multiple function and network integration approaches discussed.

SUMMARY OF THE INVENTION

The present invention relates to a Multiple Integrated Machine System (MIMS) that integrates into a single housing multiple digital hardware and software machine elements in such a manner that several very different Information Digital machines can be selected. The user can select the MIMS digital machines from a MIMS selector switch and have available all of the functions that the MIMS designer incorporated into the selected digital machine. To make the MIMS more user friendly the functions available with a particular MIMS digital machine selection come from regrouping the digital hardware and software machine elements incorporated into the MIMS.

In the example used to demonstrate the invention method a number of office digital hardware and software machines elements and PC digital hardware and software machine elements are combined into a single MIMS along with phone digital hardware and software machine elements, TV hardware and software machine elements, and network hardware and software machine elements and connections. The digital hardware and software machine elements are regrouped in the MIMS to allow four machines to be selected.

The MIMS digital machine selections are referred to as, (a) a SOHO digital machine, (b) a TV digital machine, (c) a Network digital machine and (d) a PC digital machine. Each of the selected MIMS digital machines have additional digital machine function or subgroup modes which can be selected.

For example, in one preferred embodiment, the MIMS SOHO digital machine has four additional digital machine function or subgroup modes referred to as, (a) a message center mode that allow Phone, Pager, Fax, and E-mail functions, (b) a Storage center mode allowing, Floppy drive, Fixed Hard drive, Portable Hard disk, Tape drive, CDROM drive along with a PCMCIA memory slot functions (c) a Document center mode which allows printing, copying, and scanning functions, (d) an Internet center mode which provides for Web site, service provider, and a Search engine functions. Each of the MIMS digital machines selected operates as if the digital machine was located in a separate housing.

In essence the MIMS provides a user with all of the capabilities normally requiring a Client/Server system connected to numerous digital machine housings at many separate locations. The MIMS allows all of this and more at a single location, at much less cost, and with a much more user friendly and reliable system. With MIMS digital machine designs, manufactures can use their own proprietary hardware and software, rather than be bound to conform to interface requirements of multiple digital machine and multiple software manufacturers as currently required. The difference between digital machine switching and function mode switching is that the set of MIMS hardware and software elements available are both changed when switching between the available MIMS digital machines where as only software programs sets are changed when switching between the available mode functions of a selected digital machine. In other words this invention describes a general hardware and software machine element integration process by which the basic elements of several (at least two) digital information machines are integrated into a single information digital machine system akin to what was done when separate electrical circuit components were integrated onto a single chip to create the integrated circuit process except the current process allows predetermined combinations of elements to be combined upon command to produce distinct circuits performing different functions.

That is, the Multiple Integrated Machine System (MIMS) described herein integrates hardware and software elements from several digital information digital machines into a single MIMS and provides a means to select various digital information machines to operate which have more functions than the digital machines had separately before being integrated into the MIMS. The first digital machine elements incorporated into the MIMS are those from a PC digital machine. Other digital machines elements incorporated into the MIMS housing come from Phone, Fax, Printer, Scanner, copier, E-mail, Storage, and more such digital information digital machines. All of the other digital machine elements incorporated are referred to as Small Office Home Office digital machine elements. After the elements are incorporated, a MIMS PC digital machine can be selected, the user can then operate the MIMS just as if the user had a regular PC digital machine connected to the other digital machines incorporated into the MIMS.

However it is much more convenient to print, copy, fax, and scan documents, because of the MIMS single housing or co-location design feature. When the SOHO digital machine is selected all of the various communication and document tasks can be accomplished without having to use a PC digital machine. Thus, many existing type digital machines are physically, functionally and logically combined and integrated into one digital machine to eliminate duplication of many parts and software elements.

Preliminary analysis of cost savings using off the shelf parts shows close to a 80% reduction in cost over buying the PC digital machine and the Multifunction digital machines separately. Also, those users who currently have learned to use a particular manufacturers Multifunction digital machine (e.g. HP, Epson, Cannon, Xerox etc), will have similar operating procedures when that manufacture implements the design of this invention. When the MIMS includes a PC digital machine it still has a the capability to Network with other computers and share it's resources just as if several separate digital machines were connected to the network including the MIMS PC digital machine.

Because of the digital machine cost savings alone, the current invention probably would eliminate the need for network computers except for database sharing in small to medium size offices. Even in large companies, resource sharing of fax, scanners, E-mail, printers, modems, etc. would be greatly reduced and the need for complex costly and unreliable high-speed printers and copy digital machines becomes questionable.

That is, the MIMS SOHO digital machine mode of operation virtually solves all of the problems currently being addressed by client/server system designers, and with a much simpler and reliable design. The reliability factor alone, (i.e. every workstation has most of the required resources locally and network failures only effect shared databases etc.) makes this invention a very sound business approach since man-hours is still most companies largest inefficiency.

Energy consumption is another great saving brought about by the Multi-Mode single power supply design. Energy savings is close to 80% over individual digital machines operating separately (i.e. PC digital machine, Fax, copier, printer, scanner).

When the MIMS SOHO digital machine is selected the individual can easily print, copy, scan documents, send faxes and E-mail, type letters and memos directly at the MIMS by using predetermined and simple selection and simple screen touch controls rather than having to be PC digital machine literate. Other improvements allow the individual to read messages received by the MIMS before selecting those messages which need to be printed. Paper savings will be enormous over the current Fax digital machines operating in standalone fashion. Currently Faxes must go to a PC digital machine separate from the Fax or Printer digital machine to have this preview paper saving capability.

The virus, hackers, Internet privacy problems wasting so much time are additional by products of this same design approach. A PC digital machine mode should be (at most) only one of the selectable digital machines in a MIMS designed for a company. The MIMS designers should focus first on the company operational tasks such as order entry, accounts receivable, etc. to have a MIMS company digital machine.

These can be combined along with office tasks such as faxing, E-mail, document scanning, copying, web site access, etc to have a single office MIMS housing that has several selectable digital machines. MIMS designed digital machines will allow these tasks to be accomplished simply, quickly, and reliably while avoiding TMM/TMI, which was discussed above in the Background section. Also, in the future, the Service industry will most likely start renting PC digital machine's (see co-pending application for such a PC digital machine rental system). A MIMS, such as described herein may be the only digital machine that a company or person needs to be fully functional in a typical SOHO information age environment. The employee training and digital machine service cost alone would yield tremendous savings to companies.

The SOHO storage mode adds convenient storage capabilities to the MIMS that currently are not available in information digital machines other than PC digital machines or very specialized digital machines (see iomega beyond the PC products brochure given out at the 1998 Comdex show). These features will make it much easier for the SOHO individual to input and save digital machine information with out having to be PC digital machine literate. For example, received color messages can be stored on a Floppy disk located at one digital machine and transported to a color printer (more expensive MIMS) located at another digital machine or saved to the hard drive for later processing. In one preferred embodiment, two other digital machines, a TV digital machine and a Network digital machine, are incorporated into the MIMS to have a four digital machine system. Many more advantages to these options will be discussed in the more detailed description of the MIMS.

BRIEF DESCRIPTION OF SEVERAL VIEWS OF THE DRAWINGS

FIG. 2a is a logical stand alone block diagram illustrating the elements of the multiple integrated machine system elements before being combined into the single block diagram of FIG. 2.

FIG. 2b is an interconnect block diagram of the combined elements of the multiple integrated machine system.

DETAILED DESCRIPTION OF THE INVENTION

Figure 1:
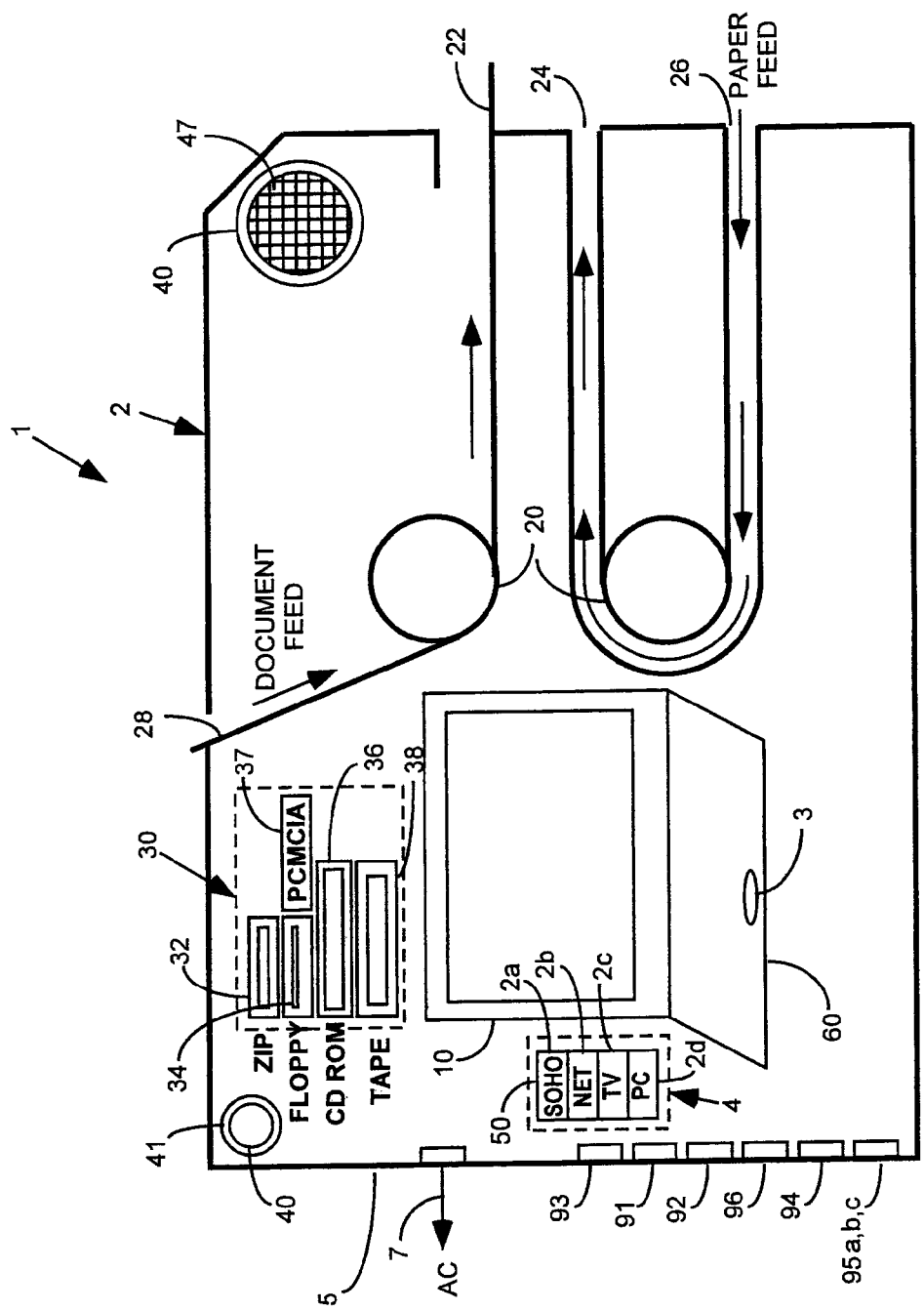
FIG. 1 is a diagrammatic view of a multiple integrated machine system (hereinafter sometimes referred to as a "MIMS"), which is constructed in accordance with the present invention.

With the aid of FIGS. 1 thru 9 preferred embodiments of one Multiple Integrated Digital machine System (MIMS) 1 is described. The MIMS 1 is capable of performing as at least two or more digital machines 2. In the preferred embodiments depicted in FIGS. 1 and 1a, the MIMS 1 includes four digital machines 2, which by way of example are a Small Office Home Office machine (hereinafter referred to as a SOHO digital machine) 51, a PC digital machine 54, a network digital machine 52 and a TV digital machine 53.

The MIMS 1 comprises two or more digital machine elements controlled by the same operating system software. In one preferred embodiment the operating system software is an operating system software commonly known in the art as "Linux" and in another preferred embodiment the operating system software is an operating system software commonly known in the art as "Windows NT". In one preferred embodiment each digital machine element includes hardware portions and software portions as shown in the drawings and discussed hereinafter. Each machine element is capable of performing as part of one of the digital machines 2 and in one preferred embodiment each of the machine elements are different in structure and performance.

The MIMS 1 further comprises a digital machine element grouping control unit 4 utilizes the same operating system software, such as Linux or Windows NT discussed above, for automatically and operatively connecting predetermined digital machine elements in a first combination to form one of the digital machines 2, such as the SOHO digital machine 51, upon receipt of a first digital machine selection whereby the digital machine elements forming the digital machine 2 are capable of performing one or more functions of the digital machine 2, and automatically and operatively connecting predetermined digital machine elements in a second combination to form another one of the digital machines 2, such as the PC digital machine 54, upon receipt of a second digital machine selection whereby the digital machine elements forming the second digital machine are capable of performing one or more functions of the second digital machine. The first combination of predetermined digital machine elements is different from the second combination of digital machine elements. Each of the digital machines 2 can have its own operating system software which can be different than the operating system software utilized by the digital machine element grouping control unit 4, or the operating system software utilized by the other digital machines. For example, in one preferred embodiment the operating system software utilized by the digital machine element grouping control unit 4 is a publicly available operating system software, such as Linux, and the operating system software utilized by the PC digital machine is a Windows operating system software produced by Microsoft, Inc.

Figure 1A:
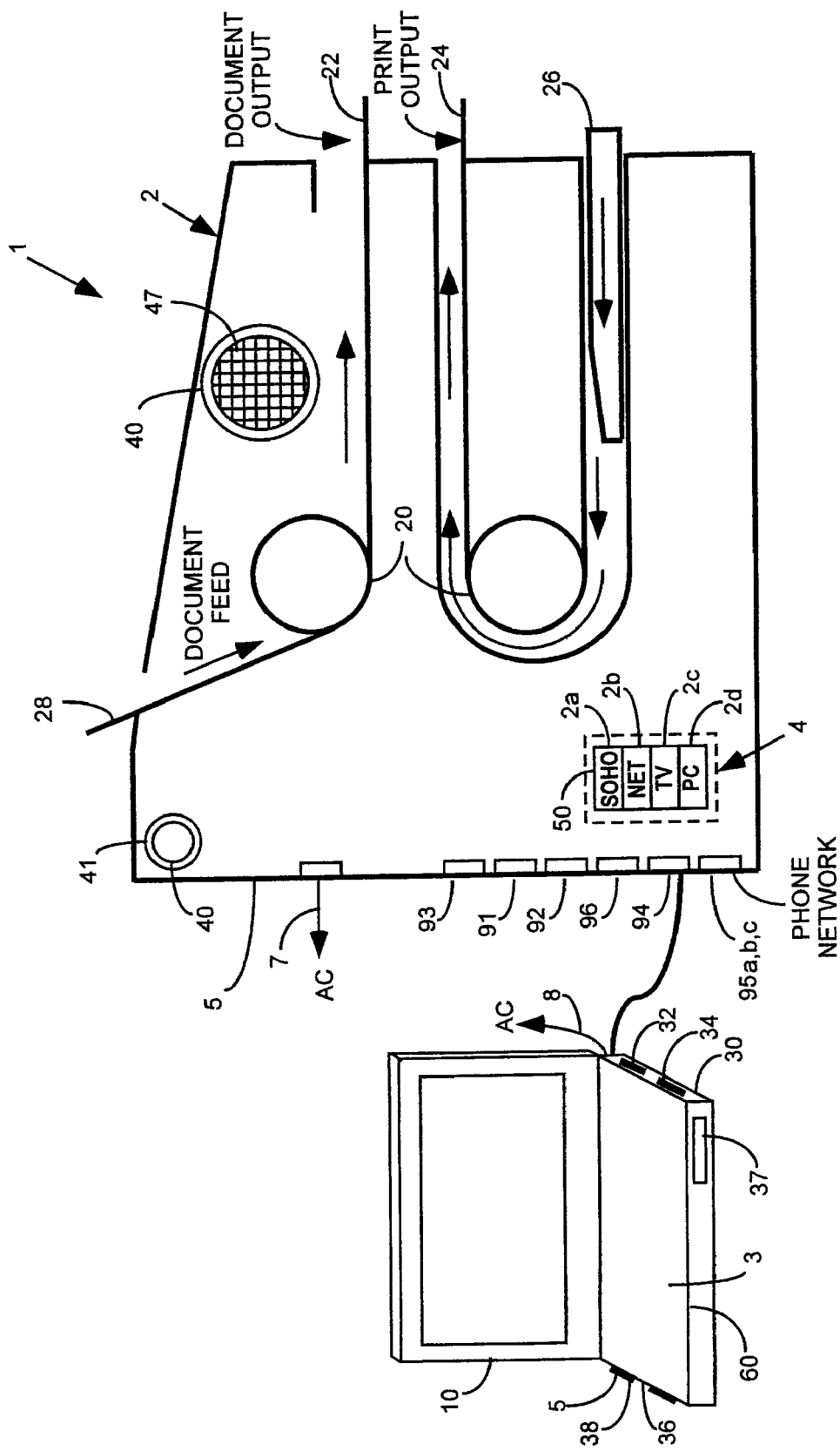
FIG. 1a is a diagrammatic view of a second embodiment of a multiple integrated machine system, which is constructed in accordance with the present invention.
Figure 9:
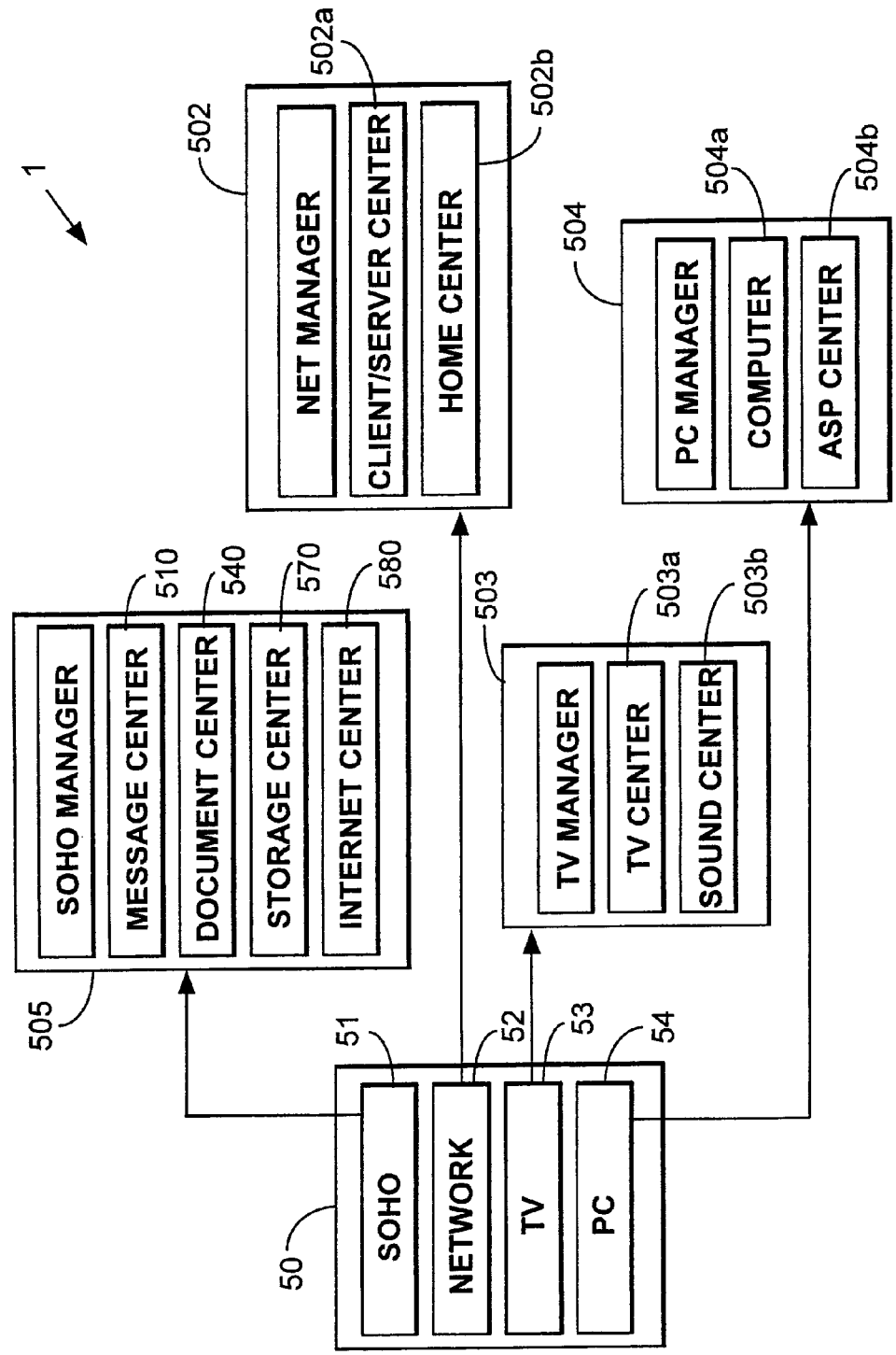
FIG. 9 is a block diagram of the digital machine selector switch for all four digital machines along with the subgroup functions selections view for each of the four digital machines.

The MIMS 1 also includes a plurality of subgroup function control units with each subgroup function control unit being associated with one of the digital machines 2. For example, as shown in FIG. 9, a subgroup function control unit 505 is associated with the SOHO digital machine 51, a subgroup function control unit 502 is associated with the network digital machine 52, a subgroup function control unit 503 is associated with the TV digital machine 53, and a subgroup function control unit 504 is associated with the PC digital machine 54. The subgroup function control units 505, 502, 503 and 504 selects for use one or more function modes to be performed by each respective digital machine 51, 52, 53 and 54. The terms "subgroup function control unit(s)", "subgroup function mode view(s) and "view(s)" are utilized interchangeably herein. The digital machine elements incorporated into a housing 5 are shown in FIG. 1 and FIG. 1a are described with the aid of FIG. 2, FIG. 2a and FIG. 2b along with FIG. 3 to describe how the individual digital machine elements are interconnected so as to allow selected digital machines 2 to share many of the same digital machine elements. Each of the four digital machines 2 that can be selected are described with the aid of FIG. 4 and FIG. 9.

Figure 4:
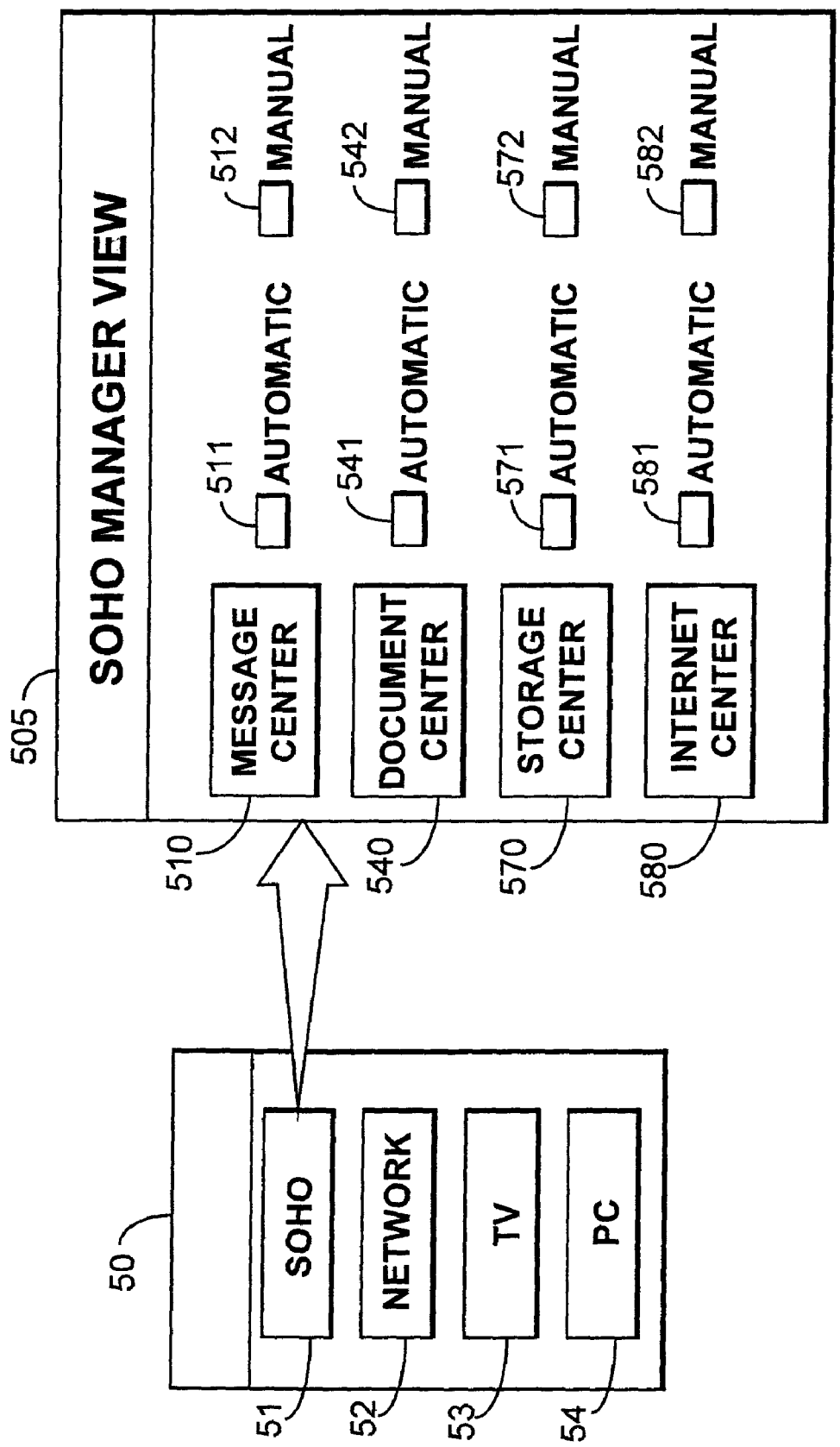
FIG. 4 is a diagram illustrating the MIMS Digital machine Selector and Information Manager Menu display views and depicting four SOHO Multifunction or subgroup modes that can be selected by the user after selecting the SOHO digital machine.

FIG. 4 also shows a digital machine manager view for the SOHO digital machine 51 that is one of the four selectable digital machines 2. The SOHO four multiple function subgroups are described in detail relative to each subgroup view available when the SOHO digital machine 51 is selected. The menus for each of the subgroup function control units for the SOHO digital machine 51 selected in FIG. 4 are described with the aid of FIGS. 5, 6, 7 and 8 to illustrate the difference between selecting one of the multiple digital machines 2 that can be incorporated into the MIMS 1 and selecting one of the multiple function or subgroup modes that allow several functions to be performed in each mode available for the selected digital machine 2.

The housing 5 for the MIMS 1 is shown in FIG. 1 along with some of the key digital machine elements. The power supply element 70 is connected to outside power via 7 and will provide power to all of the digital machine elements incorporated into each of the four selectable digital machines 2. A display 10 such as used in a portable computer like a Dell Inspiron 7500 is shown and is used by all four digital machines 2 as described in more detail in connection with FIGS. 2, 3 and FIGS. 5-8. A four digital machine selector switch 50 is shown along with four digital machine selections that are described in more detail in connection with FIG. 2 and FIG. 4. The digital machine selector switch 50 could have also been shown on the display 10 but was shown separately as touch keys on the housing 5 for clarity purposes as to draw a distinction between the selection of one of the available digital machines 2 discussed in connection with FIGS. 2 and 4 as opposed to the selection of one of the digital machines multiple function or subgroup modes where each selected individual digital machine mode allows selection of multiple functions that can be performed by that particular digital machine 2 as discussed in connection with FIGS. 2, 3 and FIGS. 5-8.

A keyboard 60 with mouse 3 such as used in a portable computer like a Dell Inspiron 7500 can be made to fold up into the housing 5 or made to attach to the housing 5 and is used by all four digital machines 2 as described in more detail in connection with FIGS. 2, 3 and FIGS. 5-8. Document feeder elements 20, 22, and 26 along with the paper feed elements 20, 24, and 26 like used in a HP office jet model 710 are used by all four digital machines as described in more detail in connection with FIGS. 2, 3 and FIGS. 5-8.

A sound system 40 having a microphone 41 and speaker 47 like used in the Micron Millennia max model 733 is used by two of the digital machines 2 but in principal could be used by all four digital machines 2 if sound commands were incorporated into controlling the operation of each selected digital machine 2 for example.

Communication connections to the MIMS 1 are made via connectors 91 through 96. Connection 91 is a standard RS 232 connection for connecting any of a multitude of devices using such standards such as a digital camera. Connection 92 is a standard USB connection for connecting any of a multitude of devices using such standards such as a video camera. Connection 93 is a standard network connection such as RJ 45 for connecting any of a multitude of network devices such as used in modern office client server network. Connection 94 is a standard Parallel 25 pin connection such as used by most printers for connecting any of a multitude of devices such as a video camera. Connection 95 is a set of three RJ 11 connections (could be one DSL connection) for connecting a number of phone lines so that several phone dependent devices in several digital machines 2 can be operating simultaneously when the digital machines 2 are placed in automatic mode as described in more detail in connection with FIG. 4. Connection 96 is a standard RJ 51 cable connection for connecting high bandwidth systems such as a TV network to the MIMS 1.

A storage system 30 with a hard disk plus a number of storage elements are shown in convenient proximity to the MIMS digital machine operator. A removable hard disk 32 such as used by Iomega along with standard storage drives for Floppy disk storage units 34, PCMCIA storage units 37, CD ROM or DVD storage units 36 and Tape storage units 38 are shown in FIG. 1. The storage elements are used by all four digital machines as described in more detail in connection with FIGS. 2, 3 and FIGS. 5-8.

The elements and connections described in FIG. 1 are all incorporated into a single housing which only requires the consumer to unpack a single unit and make the proper power and communication connections to have a four digital machine system ready for operation within a manner of a few minutes. The fact that one of the four digital machines 2 that can be selected (see selector 50) is an advanced PC digital machine 54 that can print without having to be connected by external cables to a separate printer digital machine or can scan documents with out having to be connected to a separate scanner digital machine is truly convenient to the consumer.

But when one also considers that another of the four digital machines that can be selected (see selector 50) is a small office home office (SOHO) digital machine 51 which has four multifunction or subgroup modes (see FIG. 4) of which just one of the four multifunction or subgroup modes is the equivalent of a single "multiple function digital machine" being built today such as a HP model 710 multiple function digital machine then the features incorporated into the MIMS design becomes apparent.

Verification that the consumer wants true digital machine "plug and play" is evident by the resurgence of interest in the Apple Computers when they recently combined many of the simple PC elements into a single housing such as the modem and sound system that are configured automatically when the consumer makes a few simple connections. The Apple changes were just to a single multiple function digital machine but the consumer embraced the "plug and play" digital machine element packaging approach.

The multiple digital machine elements in the same housing were also proven quickly with for example the popularity of the single digital machine with multiple functions such as the HP model 710 multifunction digital machine that performs four functions when connected to a PC. When not connected to a PC the HP model 710 digital machine can perform two functions. The convenience features of the multiple digital machine each with multiple modes each having multiple functions will become more evident with the descriptions in connection with FIGS. 5-8.

In FIG. 1a all the elements described in connection with FIG. 1 are again shown but rather than have all elements incorporated into the single housing 5, a basic computer housing is connected to a much lower cost housing for the other elements required to construct the same four digital machine MIMS 1.

Such an arrangement of elements is the preferred embodiment that allows manufactures much more flexibility and allows consumers with computers (especially portable computers) to purchase the low cost version of the MIMS 1 until they are ready to upgrade to a single housing MIMS 1. Also the element configuration of FIG. 1a allows the housing 5 elements with the digital machine selector switch 50 to be connected to the PC housing 5 elements via an office network system connector 93 where every client on the network would have a four digital machine MIMS 1 at their disposal even though they might have to go to a different location to use some of the document center functions.

Figure 2:
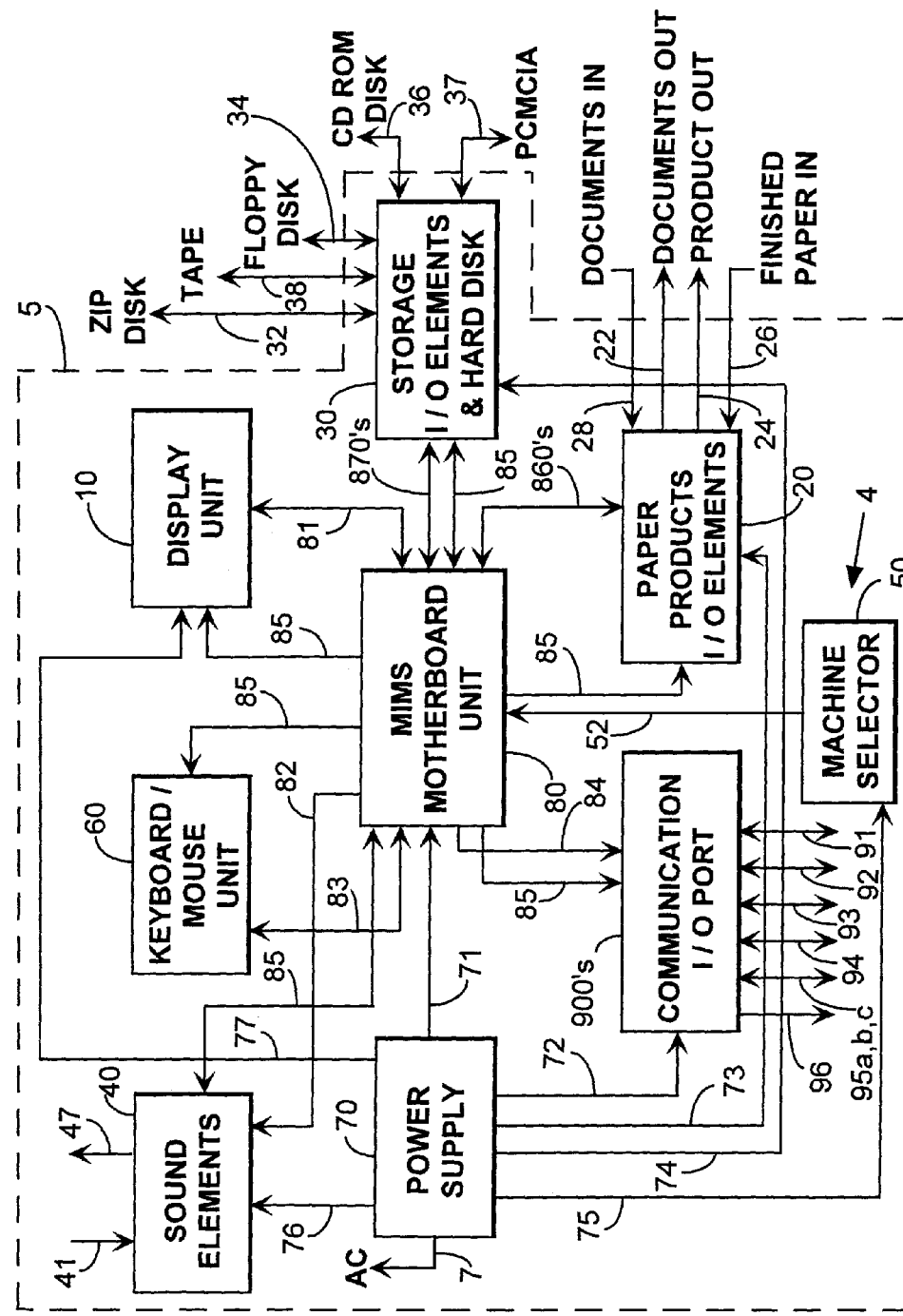
FIG. 2 is a block diagram of the multiple integrated machine system in its logical interconnect form.

MIMS key subsystem electronic machine elements corresponding to the physical digital machine elements of FIGS. 1 and 1a are shown in FIG. 2 and again in FIG. 2a and FIG. 2b. In FIG. 2 the key subsystem machine elements inside of the MIMS housing 5 along with their interconnections are shown. The power supplied to all of the key subsystem elements is derived from the common power supply 70 and sent to the key subsystem machine elements described in FIG. 1 and shown again in FIG. 2 in their electrical form via lines 71, 72, 73, 74, 75, 76 and 77.

The preferred power supply 70 embodiment would have redundant power supply ability to supply key machine elements such as the MIMS motherboard unit 80. The MIMS motherboard unit 80 in combination with the digital machine selector switch 50 form the digital machine element grouping control unit 4. That is, the MIMS motherboard unit 80 and the digital machine selector switch 50 cooperate to provide all of the functionality of the machine element grouping control unit 4.

The power supply 70 receives energy from line 7 which could be either ac or dc energy. The key subsystem logic elements are housed on the MIMS motherboard unit 80 discussed in detail in connection with FIG. 3. The MIMS motherboard unit 80 in cooperation with the digital machine selection switch 50 connected to the MIMS motherboard unit 80 via line 52 controls the predetermined subsystem elements used by each digital machine 2 selected and in part helps configure the predetermined individual function mode selection subsystem element drivers discussed in more detail in connection with FIG. 3. For example if a digital machine 2 is selected via the digital machine selection switch 50 via line 52 connected to the MIMS motherboard unit 80 that requires the use of the sound system 40 elements 41 or 47 the line 85 from the MIMS motherboard unit 80 selects the digital machine elements to go with the selected digital machine 2 that uses the sound system 40 elements 41 and 47 in some or all of its predetermined function mode functions.

Subsequently the line 82 from the MIMS motherboard unit 80 is connected to the sound system 40 elements 41 or 47 as required by the function mode control menu selections described in more detail in connection with both FIG. 3 and FIGS. 5-8. A similar connection process allows commands sent on the digital machine selection line 85 along with commands sent on the mode function selection line 81 to control the MIMS display 10. The MIMS keyboard 60 is connected and controlled by commands sent on line 83 and commands sent on line 85 in a similar manner.

The predetermined communication ports are selected for the digital machine 2 by commands sent on line 85 and for the function or subgroup modes by commands sent on line 84. The predetermined storage elements 30 are selected for the digital machine 2 by commands sent on line 85 and for the function or subgroup modes by commands sent on lines 870's described in more detail in connection with FIG. 3. The predetermined paper product elements are selected for the digital machine 2 by commands sent on line 85 and for the function or subgroup modes by commands sent on lines 860's described in more detail in connection with FIG. 3.

In FIG. 2a and FIG. 2b and alternative description of how common generic elements from individual multiple function digital machines are integrated into a single system whereby the individual subsystem elements can be shared and predetermined individual digital machines can be constructed in the multiple integrated digital machine system so that the selected digital machines have more multiple function capability than they had before being integrated into a MIMS designed system. For the sake of clarity items on FIGS. 2a and 2b are identified so as not to correspond to items on any of the other Figures since FIGS. 2a and 2b are only used to describe the invention in terms that might make the integration process more clear to those skilled in the art of digital machine design.

In FIG. 2a six multiple function digital machines are depicted wherein all of the key subsystem digital machine elements of each digital machine such as 003 representing the keyboard (KB) element, 005 representing the housing (H) element, 007 representing the power supply (PS) element, 010 representing the display (D) element, 015 representing the software driver (SDE) elements, 020 representing the paper product (PU) elements, 022 representing the memory (M) element, 025 representing the hardware driver (HDE) elements, 037 representing the software program (SE) elements, 040 representing the storage elements (STE), 050 representing the computer (C) element, and 060 representing the connector port (CP) elements. For each digital machine 2 that has such a digital machine element described above, a digital machine symbol to denote that element is present if that particular multiple function digital machine 2 requires such an element.

The symbol "S" is used in FIG. 2a for scanner multiple function digital machine subsystem elements. The symbol "C" is used in FIG. 2a for the copier multiple function digital machine subsystem elements. The symbol "P" is used in FIG. 2a for the Phone multiple function digital machine subsystem elements. The symbol "F" is used in FIG. 2a for the Fax multiple function digital machine subsystem elements. The symbol "TV" is used in FIG. 2a for the TV multiple function digital machine subsystem elements. The symbol "PC" is used in FIG. 2a for the Personal Computer multiple function digital machine subsystem elements. Thus FIG. 2a shows how much redundancy is present when the six digital machines shown are purchased separately and especially if the digital machines are purchased by the same individual or company which is normally the case.

FIG. 2b shows the same elements with the number "1" preceding each of the generic subsystem machine elements and adding an "M" following the digital machine element such as 1003M in FIG. 2b to denote the shared key board in the MIMS design versus the six 003 keyboards of FIGS. 2a and 1010M in FIG. 2b denoting the shared display in the MIMS design versus the six 010 displays of FIG. 2a. The descriptions of FIGS. 2a and 2b along with the operational description given with FIG. 2 make it clear to those skilled in the art how to physically and electrically integrate the multiple digital machine elements into the single housing 5 where many of the subsystem digital machine elements are shared by each of the predetermined selectable digital machines 2.

Figure 3:
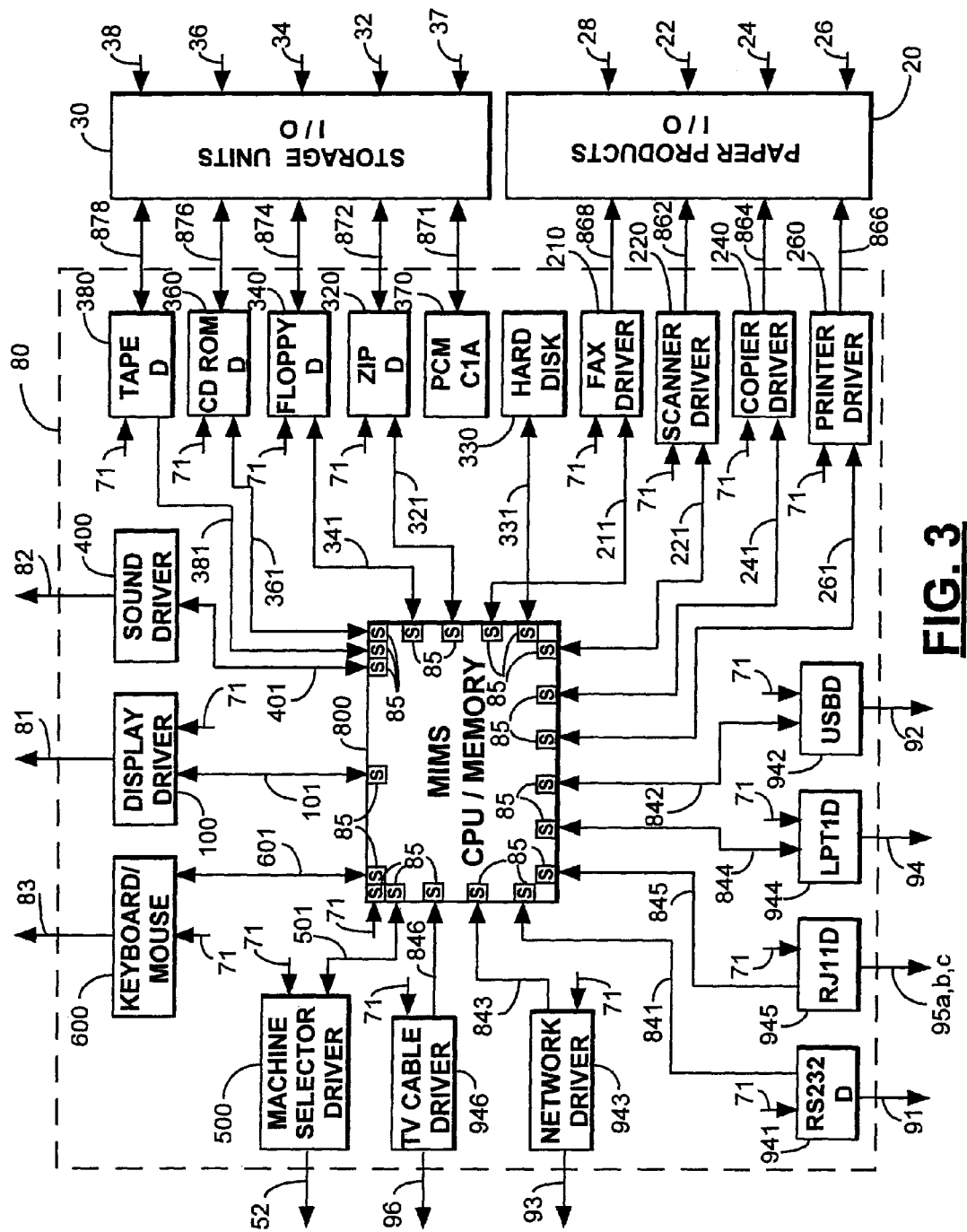
FIG. 3 is a diagram showing the key subsystem hardware and Software elements which are fixed automatically when the various stand alone digital machines are selected.

In FIG. 3 the MIMS motherboard 80 design is further described to make it clear to software designers skilled in the art how to construct and control the key subsystem digital machine elements used in the four digital machine system used to describe the MIMS design method. In FIG. 3 the MIMS hardware and software drivers located on the MIMS motherboard 80 are each shown receiving power via line 71 and interconnected to a MIMS computer processor and memory unit 800 that also receives power via line 71.

The MIMS computer processor and memory unit 800 houses the digital machine configuration control logic for each of the key subsystem machine elements and can be built using one (or several if redundancy is important) Intel Pentium III class processor with 256K of cache memory connected to 128 megabytes of RAM by those skilled in the art using one of the linux or Windows NT operating systems or each manufacture can design their own operating system since most of the drivers and programs are digital machine specific. The MIMS computer processor and memory unit 800 runs the operating system software to automatically and operatively connect predetermined digital machine elements in predetermined combinations to form the digital machines 2, such as the SOHO digital machine 51, the network digital machine 52, the TV digital machine 53 and the PC digital machine 54. This is especially true for future digital machines where the PC digital machine 54 is not even one of the selections (most likely for MIMS 1 built for company use) or the PC digital machine 54 is nothing more than a webTV based service provider requiring a local keyboard, display, storage, and printing system.

Each of the four digital machine configurations are predetermined and the predetermined key subsystem digital machine elements are connected automatically upon selection by the digital machine operator of one of the four choices provided by the digital machine selector switch 50. Upon selecting a specific digital machine 2 via the digital machine selector switch 50 the 800 unit is notified via line 52 connected to the digital machine selector hardware driver 500 which is connected to the MIMS computer processor and memory unit 800 via line 501.

Once the MIMS computer processor and memory unit 800 receives a signal on line 501 to the software driver (noted by the "s block connected to line 501") associated with the digital machine 2 selected, a unique command is sent out on line 85 connected to all other key element software driver blocks also located on the MIMS computer processor and memory unit 800 and to all the hardware driver elements as discussed in connection with FIG. 2.

Depending upon the predetermined command generated by the 501s software driver and sent to all other software driver control programs via line 85 each key subsystem digital machine element can then be made to operate as part of the selected digital machine 2 or not made to operate as part of the selected digital machine 2 or made to operate in a particular fashion as part of the selected digital machine 2 (for example the software and hardware driver for the printer element might be one configuration when the SOHO digital machine 51 is selected and another configuration when the PC digital machine 54 is selected).

Once the digital machine key subsystem software driver elements which are drivers normally supplied by the manufactures of these elements housed on the MIMS computer processor and memory unit 800 are activated via the command from 501s sent via line 85 to one or more of the 601s, 101s, 401s, 381s, 361s, 341s, 321s, 331s, 211s, 221s, 241s, 261s, 842s, 844s, 845s, 841s, 843s, and 846s drivers they then cause an active set of predetermined digital machine hardware and software drivers to be formed that can be used by the selected digital machine 2 subgroup function control unit, e.g. the multiple function mode control menus (described in more detail in connection with FIG. 4 and FIGS. 5-9) to cause the selected digital machine 2 to perform predetermined functions using predetermined programs that cause the digital machine 2 to perform the predetermined function selected by the digital machine operator from one of the menus.

These activated hardware elements are subsequently controlled via active software drivers 601s, 101s, 401s, 381s, 361s, 341s, 321s, 331s, 211s, 221s, 241s, 261s, 842s, 844s, 845s, 841s, 843s, and 846s sending commands via lines 601, 101, 401, 381, 361, 341, 321, 331, 211, 221, 241, 261, 842, 844, 845, 841, 843, and 846 to the hardware driver elements 600, 100, 400, 380, 360, 340, 320, 330, 210, 220, 240, 260, 942, 944, 945, 941, 943, and 946 each of which can be made from well known electrical interface units to those skilled in the art.

For example digital machine element 330 could be the equivalent of a Maxtor 20.4 GB IDE hard drive model 92040D or the equivalent of a 18.2 IBM model 31835ON using a SCSI controller Adaptec model 294OU. Digital machine elements 320 and 340 could be the equivalent of the Presario 1800 3.5" 120/1.44 MB hi-capacity super disk drive, element 360 could be the equivalent of Toshiba model XM6602B or element 360 could be the equivalent of Toshiba DVD RAM 3 drives in one, element 380 could be the equivalent of Sony Model 7000AI, element 370 could be the equivalent of the type II card slot in the Sony Model VAIO Z505. It should be noted however that there are the equivalent of two modems for 945 elements such as a Compaq 56K V.90 data/fax modem plus a legacy public phone interface along with a DSL for fast internet connection and Voice over Internet Protocol (VoIP) drivers and the network 943 elements could have both wireless and hardwire connection port drivers for many home or office appliances being built to use the new wireless network protocol such as Bluetooth and the Wireless Application Protocol (WAP) being incorporated into mobile devices. These hardware and software drivers are commercially available and the prior art versions or newer versions incorporated into the MIMS 1 by those skilled in the art. Once one of the digital machines 2 is selected by the digital machine selector switch 50 using the method described in connection with FIG. 3 then the selected digital machine 2 can perform predetermined functions as described with the aid of FIG. 4 and FIGS. 5-9.

FIG. 4 shows the four digital machine selector switch 50 where the SOHO digital machine 51 has been selected and the selection causes a configuration manager view 505 to be displayed to the digital machine operator. In one preferred embodiment, the SOHO digital machine 51 has at least two (and preferably all) of the function modes selected from the group comprising a message center mode, a document center mode, a storage center mode, and an internet center mode as indicated by the reference numerals 510, 540, 570, or 580 of the SOHO digital machine to operate either automatically by selecting 511, 541, 571, or 581 or manually by selecting 512, 542, 572, or 582. When operating automatically both the hardware and software driver elements discussed in connection with FIG. 3 are activated even though the SOHO digital machine 51 might not be the currently selected digital machine.

The automatic selection is the preferred default selection for the SOHO digital machine 51. The reasons will become more apparent when discussing the multiple functions associated with each of the four SOHO digital machine function or subgroup modes 510, 540, 570, and 580 described in more detail with the aid of FIGS. 5-8.

Each of the FIGS. 5-8 shows a selection view which first appears when one of the four functions or subgroup modes is selected from the display 505. The selection view has three additional managers views, for each of the subgroup functions that can be selected, shown on the same Figure as the selection view for clarity purposes. These additional subgroup function views for each of the four subgroup function modes are all part of the single SOHO digital machine 51. Upon selecting one of the three subgroup functions views from the selection menu in each of the four Figures the actual predetermined functions that can be performed are available to the operator using choices available on one of the three subgroup functions views.

Figure 5:
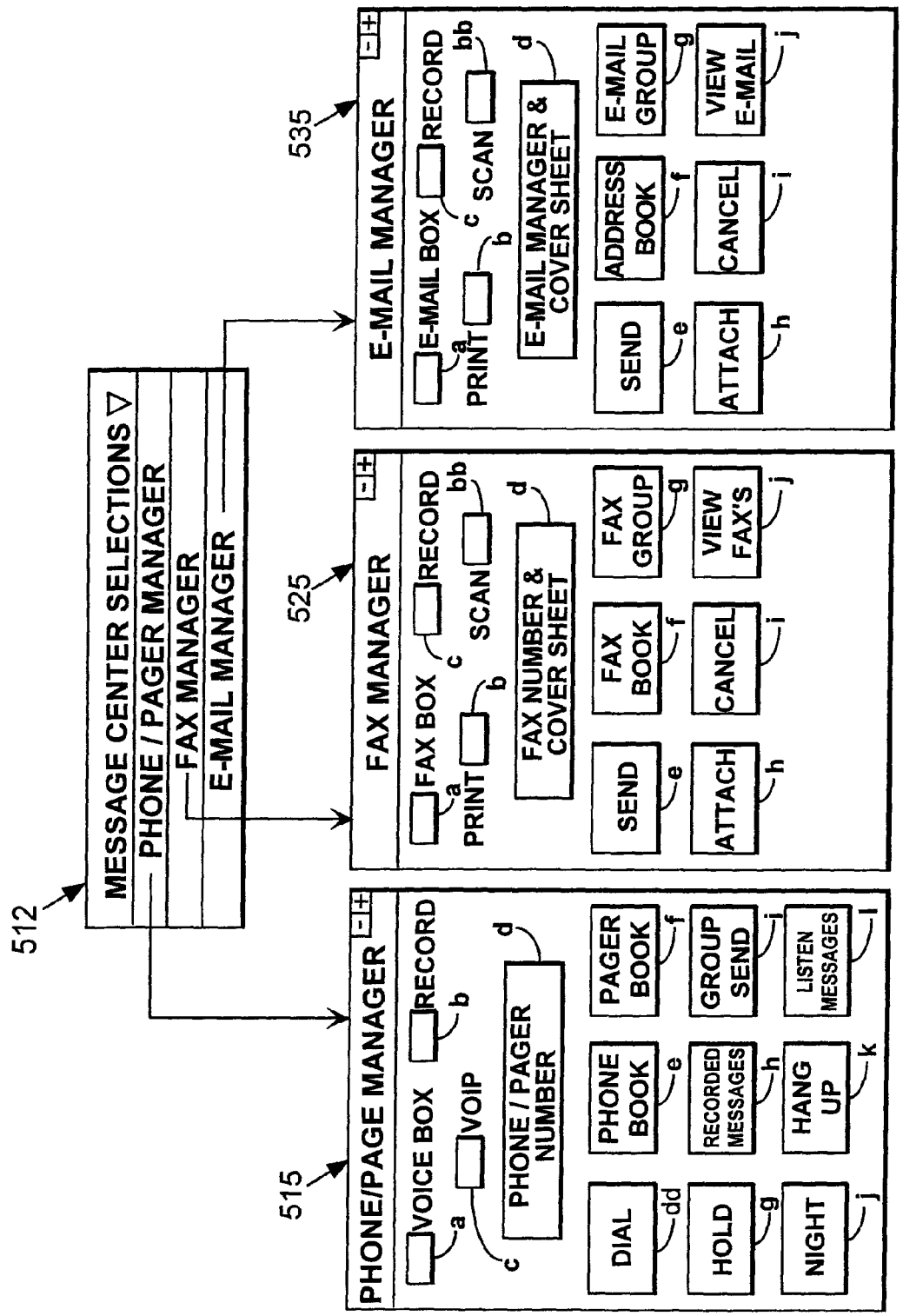
FIG. 5 is a more detailed illustration of the MIMS SOHO digital machine Message Center Manager display views depicting the Phone/Pager, Fax, and E-mail Manager View option choices.

For these descriptions it will be assumed that each of the four SOHO digital machine subgroup function modes subsystem machine elements have been placed in the automatic position. This action for example allows all three phone lines 95a, 95b, and 95c to be in operation at the same time. For example, as shown in FIG. 5, the SOHO digital machine 51 could be sending e-mail via one of the methods selectable from view 535, answering the fax line via one of the methods selectable from view 525, while the operator is using view 515 to talk on the phone. If for example the SOHO digital machine 51 was not in the automatic mode the fax line and e-mail line might not be made to operate if view 515 was selected by the operator. The simple function features given as an example for FIG. 5 operating in the automatic mode are currently only available with office message centers connected into elaborate and expensive client/server systems.

With the MIMS design most of these common occurrence type multiple operating functions are automatic and each of them take place by predetermined methods designed into the system, rather than by skills learned to operate a complicated PC or Work station system. More interesting is that these same three functions could also be taking place simultaneously if the operator had been using the PC digital machine 54 and wanted to use skills learned at some earlier time and possibly do more sophisticated PC related communications task than possible when using the functions available from the three SOHO digital machine views 515, 525 and 535. Thus, the skill levels of the MIMS user can range from the sophisticated client/server user to the PC illiterate operator and in all cases the MIMS allows a much more productive person no matter their skill level. The three managers views shown with each of the FIGS. 5-8 can be displayed simultaneously, individually or placed on an icon bar that allows quick access to each of the modes or subgroup functions manager views. The main functions for each of the managers views can be described with the aid of the lower case symbols labeling each of the view choices. The 12 SOHO views shown in FIGS. 5-8 and the multiple functions shown for each view are only some of those that could be designed into a commercial MIMS 1 rather than the ones selected to demonstrate the invention in this application. However, the views selected and the functions available on each view selected are for a preferred embodiment of the SOHO digital machine 51.

For each View selected a predetermined subgroup of function software programs are loaded into the RAM memory 800 element from the hard disk 330 element discussed in connection with FIG. 3. The software programs are, in one preferred embodiment, object oriented programs that run independently once activated by a view operator command as described in connection with the manager views. These predetermined object oriented programs are part of the MIMS 1 and utilize the software driver element subsystems that had been activated for the selected digital machine 2 to perform the predetermined function selected by the operator to make the subsystem element hardware drivers work properly as discussed in connection with FIG. 3.

Since they are part of the MIMS 1, the MIMS manufacture can provide improved sub groups of software programs to their customers that can be used to up grade some or all digital machines 2 in the MIMS 1 and add more predetermined functions or even add more views instead of requiring customers to buy new digital machines 2 every few years. This software upgrade concept is currently only done for computer digital machines when a new operating system is made available such as upgrading from windows 95 to windows 98 or specialty program upgrades such as upgrading from office 97 to office 2000.

The MIMS 1 design extends the concept to multiple digital machines housed in the same apparatus other than just computer upgrades. The computer upgrades would of course still be available in the embodiment of the MIMS 1 having the PC digital machine 54 as one of the multiple digital machine selections by selecting the PC digital machine 54 and installing the upgrade package per the vendor instruction. However, in one preferred embodiment, the same operating system software controlling each of the digital machine elements of the MIMS 1 is upgraded to provide at least one or more additional predetermined combination of digital machine elements to form at least one or more additional machines and an additional subgroup function control unit for each additional digital machine than was present in the MIMS 1 prior to the upgrade. Of course, in this last embodiment, the digital machine selector switch 50 of the digital machine element grouping control unit 4 would also be automatically updated by the upgrade to provide a reference thereon to permit selection of the additional digital machine or machines added by the upgrade. Furthermore, in this last embodiment the digital machine selector switch 50 could be provided on the display 10 and selected by the MIMS user by any suitable device, such as the mouse 3, the keyboard 60 or touch keys provided on the display 10.

FIG. 5 shows the message center mode 512 selection view which appears if 570 is selected from the display 505. The managers view 512 has three additional message subgroup functions managers views that can be selected. These additional views are designated as 515 for the phone/pager functions management, 525 for the fax functions management and 535 for the E-mail functions management which are all part of the SOHO digital machine 51 single message center mode 510.

Upon selecting one of the three views 515, 525, or 535 from the menu 512 the actual predetermined functions that can be performed are available to the operator. In the preferred embodiment of operation, selecting the phone/page manager view 515 automatically allows the operator to start dialing a number using the keyboard 60 and the number shows up on the display 10 in the 515*d* window or a phone or pager directory can be used by clicking on either 515*e* or 515*f* and selecting a number. The selected number will be dialed automatically by selecting 515*dd* and sent by the legacy phone systems or over the internet if the Voice over Internet Protocol (VoIP) is used by selecting 515*c*. When a call is incoming either by legacy or over the Internet the 515 menu automatically pops up (even if another digital machine is being used such as the TV digital machine 53 or PC digital machine 54) and the calling person's number or name (if the calling number is in the phone book with a name) is given to the operator on 515*d* and the operator can take the call by selecting 515*dd* or 515*c* depending on the type of call.

In the preferred embodiment, if the incoming call includes a digital machine protocol the 515 menu will not pop up (that is the SOHO digital machine 51 will check to see if a digital machine (FAX, Modem, etc) is calling and connect to the proper view 515, 525 or 535. This feature is very important as automated digital machine communication systems become the dominant communication means in the future and ringing is not necessary if digital machine language is being sent.

The 515 view also allows the operator to cause their pager messages to show up on the display 10 if the paging company offers this dual service (send the message both Internet and wireless) as disclosed in a co-pending advanced phone system application. These messages along with audio messages can be seen by selecting 515*l*. Incoming messages that a person does not want to take can be sent to the voice box by selecting 515*a*. A person can be put on hold by selecting 515*g* and a person can hang up the phone by selecting 515*k*. Messages can be recorded to send to individuals or groups by selecting 515*b* and recording messages can be stored by selecting 515*h*. Messages can be sent to groups by selecting 515*i* and then selecting the group of numbers from 515*e* or 515*f* or typing from the keyboard 60.

When the group of numbers is complete the 515*dd* or 515*c* is selected to send the message out to all the numbers in the group. Other means of getting messages for sending or saving is to select 515*b* during a phone conversation and the portion of the conversation transpiring while 515*b* has been activated is being saved and can be heard by selecting 515*h* and can be sent to others by the method described earlier. When 515*j* is selected the phone system directs all messages to the voice box 515*a*. To cancel the view click on 515*k*.

In the preferred embodiment of operation, selecting the Fax manager view 525 automatically allows the operator to start filling in a fax cover sheet that has a predetermined format with a place for name, text, sender information and phone numbers (or using a saved cover sheet) including the number to be dialed using the keyboard 60. In this last example, the data shows up on the cover sheet presented to the operator on the display 10 shown as the 525*d* window.

Also a fax directory can be used by clicking on either 525*f* or 525*g* and selecting a number or fax group of numbers for use with the message. The selected numbers will be dialed automatically by selecting 525*e* and sent by the legacy phone systems (or over the internet if the Internet view has configured the apparatus to send all messages over the Internet). When a Fax call is incoming either by legacy or over the Internet the 525 menu will automatically pop up (even if another digital machine is being used such as the TV or PC digital machine) and the calling fax number or name (if the calling number is in the phone book with a name) is given to the operator on 525*d* and the operator can see the fax by selecting 525*j* or print the fax by selecting 525*b*. In the preferred embodiment, if the incoming call is a digital machine protocol the 515 menu will not pop up (that is the apparatus will check to see if a digital machine (FAX, Modem, etc) is calling and connect to the proper view 515, 525 or 535. The 525 view also allows the operator to attach messages to faxes that might be stored in the PC digital machine directory or from a Storage unit element by selecting 525*h* and selecting the message to be sent before selecting 525*e*. Messages can also be faxed from articles scanned in by selecting 525*bb* and then selecting 525*e*. A fax transmission can be canceled at any time by selecting 525*i*. The incoming faxes go into the fax box automatically if the operator does not respond to an incoming fax unless the print option 525*b* is selected as the no answer option. The preferred embodiment selects the fax box as the default option in case no response is given from the pop up 525 view within 5 seconds, for example. Incoming faxes or faxes stored in the fax box can be recorded on any of the storage center choices if 525*c* is selected. To cancel the view click on 525*i*.

In the preferred embodiment of operation selecting the E-mail manager view 535 automatically allows the operator to start filling in an E-mail cover sheet that has a predetermined format with a place for name, text, sender information and E-mail addresses (or using a saved cover sheet) including the e-mail address using the keyboard 60 and the data shows up on the cover sheet presented to the operator on the display 10 shown as the 535*d* window. Also an E-mail directory can be used by clicking on either 535*f* or 535*g* and selecting an address or group of E-mail address for use with the message.

The selected numbers will be dialed automatically by selecting 535*e* and sent over the internet using the ISP set up when using one of the Internet manager views when 580 is selected. When an E-mail call is incoming over the Internet the 535 menu will automatically pop up (even if another digital machine 2 is being used such as the TV digital machine 53 or PC digital machine 54) and the calling E-mail number or name (if the calling number is in the phone book with a name) is given to the operator on 535*d* and the operator can see the E-mail by selecting 535*j* or print the E-mail by selecting 535*b*.

In the preferred embodiment, if the incoming call is a digital machine protocol the 515 menu will not pop up (that is the apparatus will check to see if a digital machine (FAX, Modem, etc) is calling and connect to the proper view 515, 525 or 535. The 535 view also allows the operator to attach messages to E-mail that might be stored in the PC digital machine directory or from a Storage unit element by selecting 535*h* and selecting the message to be sent before selecting 535*e*. Messages can also be E-mailed from articles scanned in by selecting 535*bb* and then selecting 535*e* or if the 535 view is called up while on the internet, web pages can be attached and sent to individuals and groups. An E-mail transmission can be canceled at any time by selecting 535*i*.

The incoming E-mail messages go into the E-mail box automatically if the operator does not respond to an incoming E-mail unless the print option 535*b* is selected as the no answer option. The preferred embodiment selects the E-mail box as the default option in case no response is given from the pop up 535 view within 5 seconds, for example. Incoming E-mail or E-mail stored in the E-mail box can be recorded on any of the storage center choices if 535c is selected. To cancel the view click on 535i.

Figure 6:
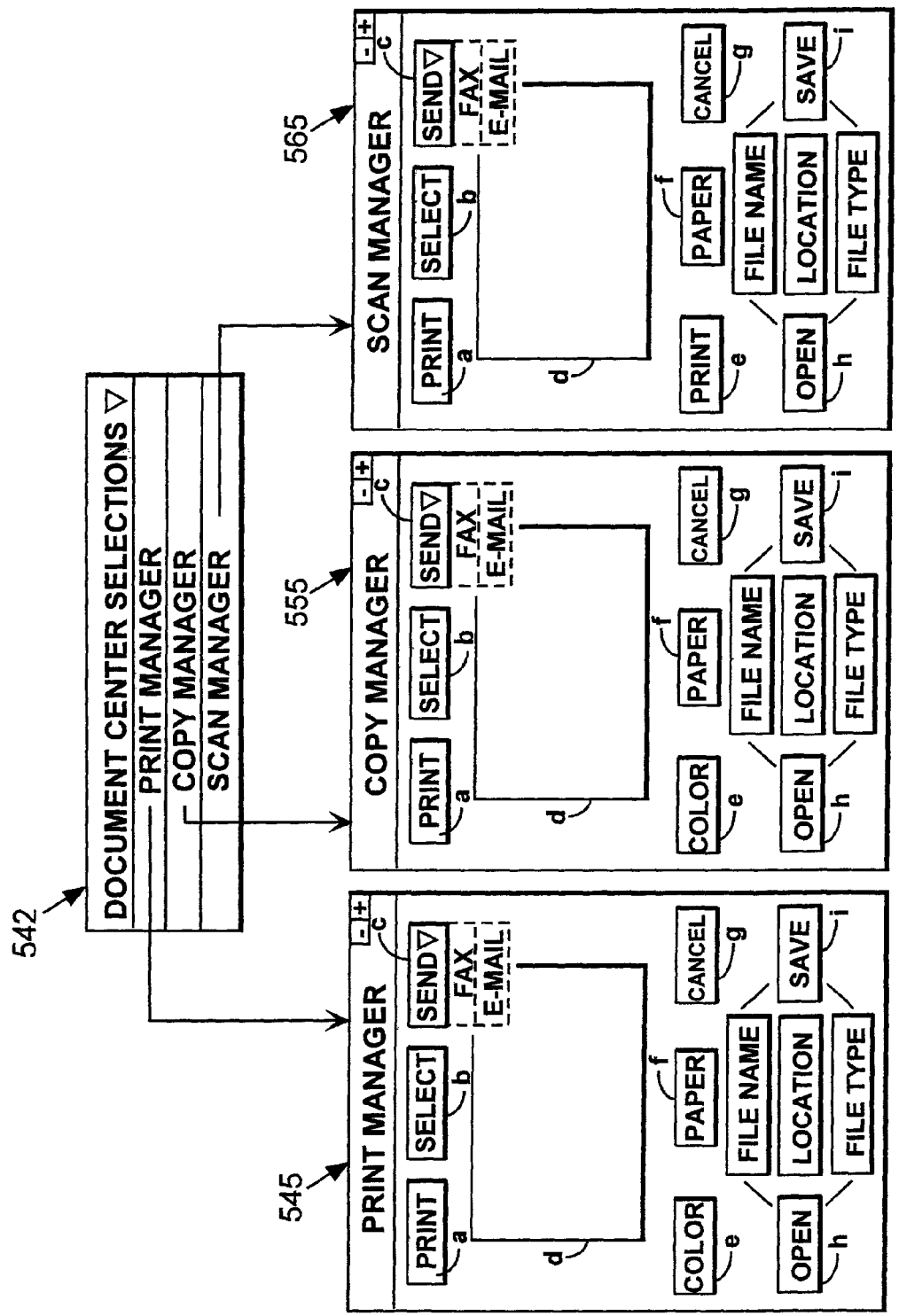
FIG. 6 is a more detailed illustration of the MIMS SOHO digital machine Document Center Manager display views depicting the Print, Copy, and Scan Manager View option choices.

FIG. 6 shows the Document center mode 542 selection view which appears if 540 is selected from the display 505. The selection view 542 has three additional document function managers views that can be selected. These additional views are 545 for the Print functions management, 555 for the copy functions management and 565 for the scan functions management which are all part of the SOHO digital machine single document center mode 540. Upon selecting one of the three views 545, 555, or 565 from the menu 542 the actual predetermined functions that can be performed are available to the operator.

In the preferred embodiment the print manager view 545 allows the operator to start typing on the display 10 as represented by 545d using the keyboard 60 and using a predetermined word processor with a predetermined Graphical User Interface (GUI) program such as MS word or a simple What You See Is What You Get (WYSIWYG) program. The operator can open a previously saved document using 545h and 545b or save a document using 545i. The select function 545b can also be used to select only a portion of a document on 545d to save using 545i, or print using 545a or send using 545c. Colors can be selected from 545e including black and white only and paper size can be selected using 545f to easily control paper requirements that are predetermined selections compatible with the hardware paper product digital machine elements 24 and 26.

Any of the printed documents on the 545d screen can be sent by e-mail or fax by using 545c as these selections automatically pull up the views 525 and 535 discussed in connection with FIG. 5. When a document is ready to print the operator mouse clicks or touches 545a or if speech commands are incorporated as discussed earlier the operator might say "print". To cancel the view click on 545g.

In one preferred embodiment, one of the digital machine elements of the SOHO digital machine 51 is a storage digital machine element, such as the removable hard disk 32, storing a plurality of predetermined email addresses and wherein when the subgroup function control unit 505 selects the document center mode 540 and the SOHO digital machine 51 receives an email message transmitted from an email address stored in the storage digital machine element, the SOHO digital machine 51 prints the email message.

In the preferred embodiment, the copy manager view 555 allows the operator to start selecting documents using 555b to copy in the paper product assembly 28 or to add another document that can be opened by 555h to the document that is in the assembly 28 (this feature is not currently available with stand alone copy digital machines). The selection function 555b also allows the single or combined documents to be reviewed prior to copying. Both documents can be put on the display 10 as represented by 545d using the 555b review option.

The operator can save a document using 545i without printing so that using just 555b and 555h along with 555i the document center allows physical documents to be added and saved without actually printing the documents. The select function 555b can also be used to select only a portion of a document displayed on 555d to save using 555i, or copy using 555a or send using 555c.

Colors can be selected from 555e including black and white only and paper size can be selected using 555f to easily control paper requirements that are predetermined selections compatible with the hardware paper product digital machine elements 28 and 26. Any of the compiled documents on the 555d screen can be sent by e-mail or fax by using 555c as these selections automatically pull up the views 525 and 535 discussed in connection with FIG. 5. When a document is ready to copy the operator mouse clicks or touches 555a or if speech commands are incorporated as discussed earlier the operator might say "copy". To cancel the view click on 555g.

In the preferred embodiment, the scan manager view 565 allows the operator to start selecting documents using 565b to scan in from the paper product assembly 28 or to add another document that can be opened by 565h to the document that is in the assembly 28 (this feature is not currently available with stand alone scan digital machines). The selection function 565b also allows the single or combined documents to be reviewed prior to saving or sending or printing (note the document pulled up from storage does not have to be scanned to the display 10). Both documents can be put on the display 10 as represented by 565d using the 565b review option. The operator can save a document using 565i without printing so that using just 565b and 565h along with 565i the scan center also allows physical documents to be added to previously saved documents and saved without actually printing the documents. The select function 565b can also be used to select only a portion of a document displayed on 565d to save using 565i, or print using 565e or send using 565c.

Paper size can be selected using 565f to easily control paper requirements that are predetermined selections compatible with the hardware paper product digital machine elements 24 and 26. Any of the printed documents on the 565d screen can be sent by e-mail or fax by using 565c as these selections automatically pull up the views 525 and 535 discussed in connection with FIG. 5. When a document is ready to print the operator mouse clicks or touches 565e or if speech commands are incorporated as discussed earlier the operator might say "print". To cancel the view click on 565g.

Figure 7:
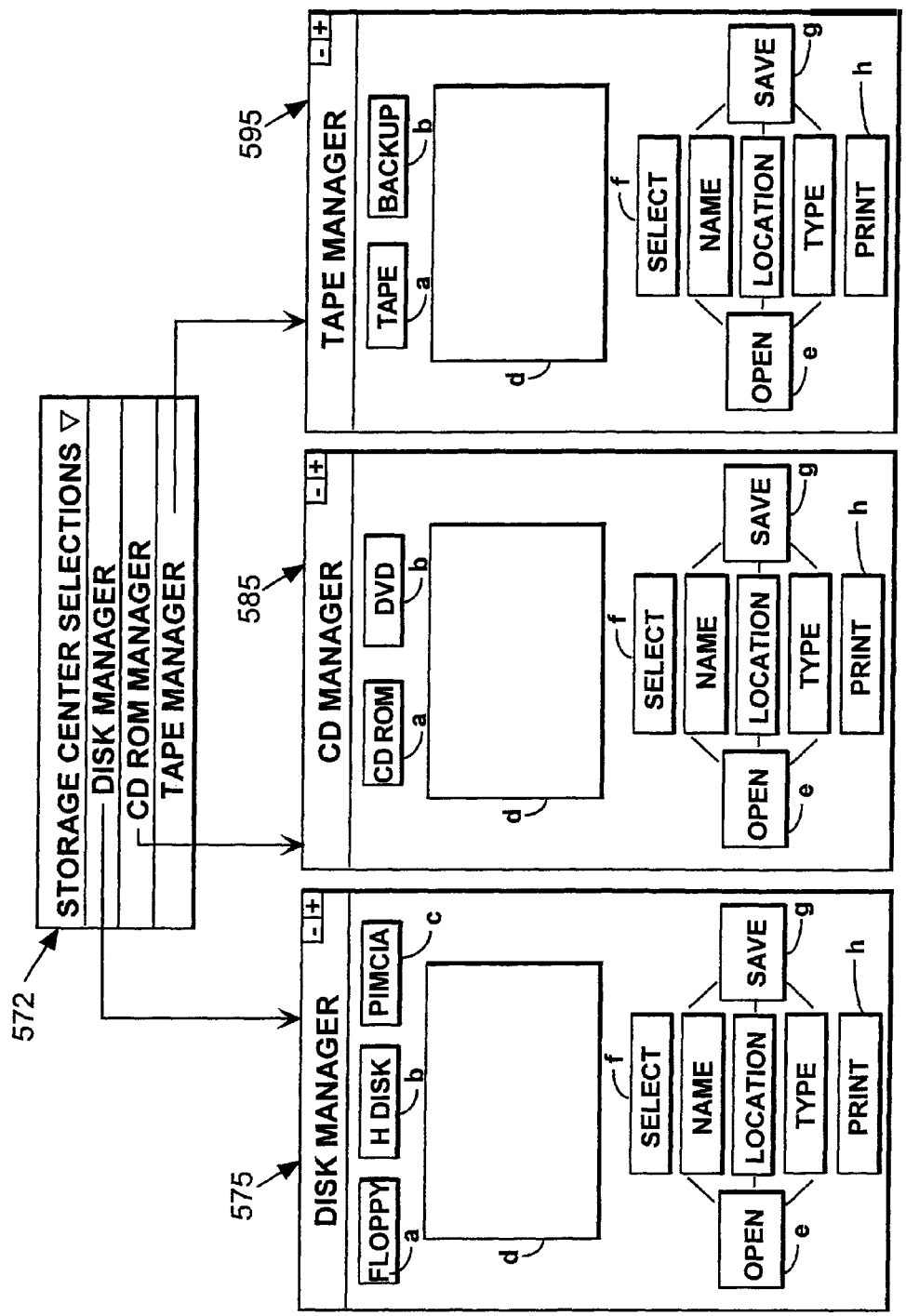
FIG. 7 is a more detailed illustration of the MIMS SOHO digital machine Storage Center Manager display views depicting the Disk, CD, and Tape Manager View option choices.

FIG. 7 shows the Storage center mode 572 selection view which appears if 570 is selected from display 505. The selection view 572 has three additional storage functions managers views that can be selected. These additional views are 575 for the disk functions management, 585 for the CD functions management and 595 for the tape functions management which are all part of the SOHO digital machine single Storage center mode 510. Upon selecting one of the three views 575, 585, or 595 from the menu 572 the actual predetermined functions that can be performed are available to the operator.

In the preferred embodiment the disk manager view 575 allows the operator to start selecting the storage elements using 575a for a floppy or other 3.5" removable disk, 575b selects the hard drive options and 575c selects the PMCIA card options. The directory and file information on the media in that drive will automatically be displayed on the display 10 as noted by 575d. 575f can be used to open any of the files selected from the display 10. The opened file can be saved to another media using 575e and 575g along with 575f or the information on the display 10 can be printed using 575h which pulls up the 545 view discussed in connection with FIG. 6.

In the preferred embodiment the CD manager view 585 allows the operator to start selecting the storage elements using 585a for a CD ROM drive or 585b selects a DVD drive even though they might use the same hardware element as discussed in connection with FIG. 3. The directory and file information on the media in that drive will automatically be displayed on the display 10 as noted by 585d. 585f can be used to open any of the files selected from the display 10. The opened file can be saved to another media using 585e and 585*g* along with 585*f* or the information on the display 10 can be printed using 585*h* which pulls up the 545 view discussed in connection with FIG. 6.

In the preferred embodiment, the tape manager view 595 allows the operator to select the tape element function using 595*a* to open up the directory for display on 10 as indicated by 595*d* or 595*b* selects the Tape backup function. When 595*a* is selected, the directory and file information on the tape will automatically be displayed on the display 10 as noted by 595*d* (non digital tapes can be displayed if the TV digital machine has been set up to convert the tapes to the display 10 otherwise they can only be displayed using the TV display as described in connection with the TV digital machine). 595*f* can be used to open any of the files selected from the display 10.

The opened file can be saved to another media using 595*e* and 595*g* along with 595*f* or the information on the display 10 can be printed using 595*h* which pulls up the 545 view discussed in connection with FIG. 6. If print is selected before a file is opened then the 545 view allows the file directory to be printed. If the backup function 595*b* is selected files can be opened using 595*e* and select opened files displayed on the display 10 using 595*f*. The selection process can be repeated until all of the files selected are ready to be backed up onto tape. Once all the files listed on the display 10 are ready to be backed up, the saved function 595*g* asks for information identifying the batch of files selected and then clicking or touching the backup function 595*b* again causes the files to be backed up onto the tape or tapes.

Figure 8:
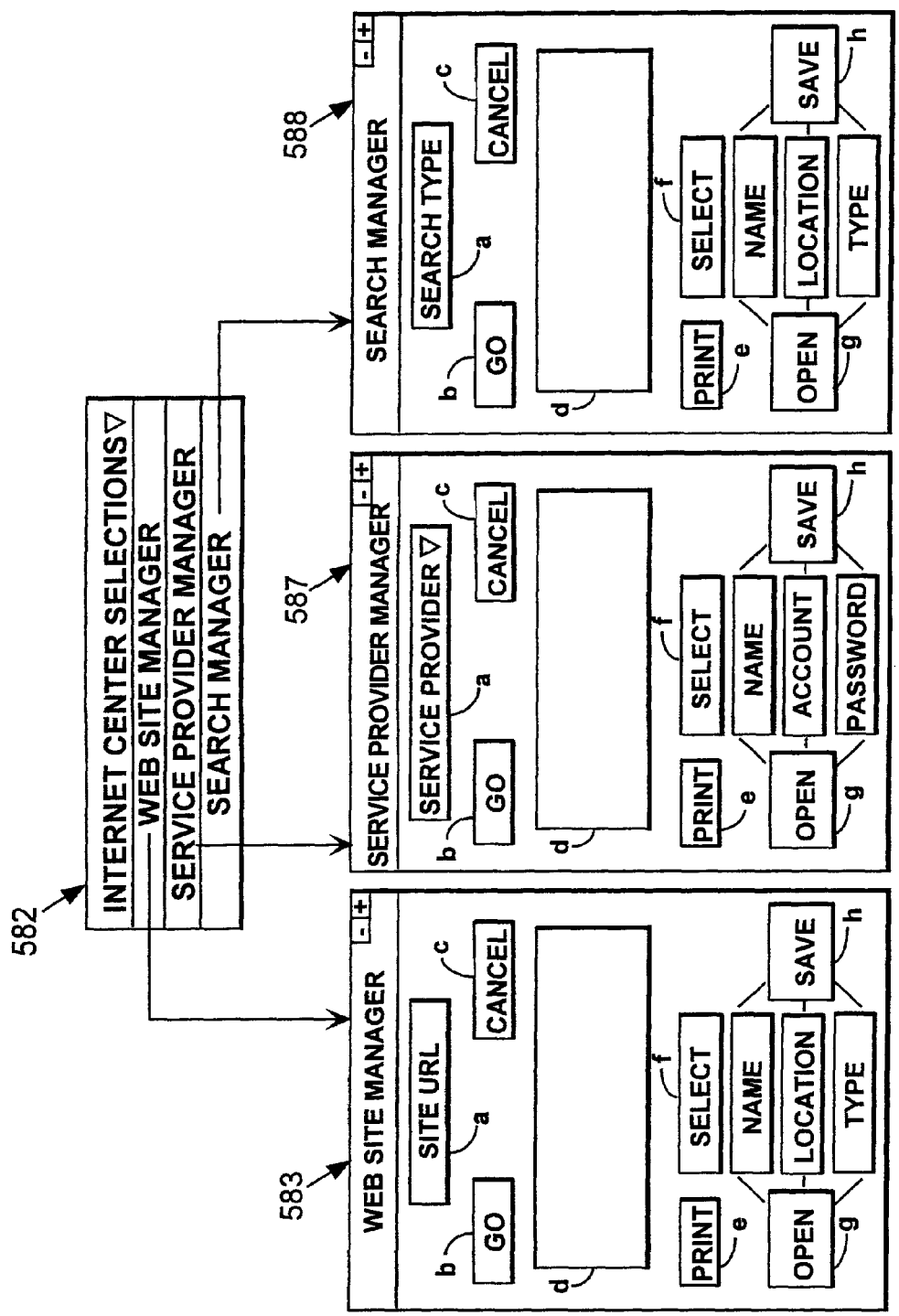
FIG. 8 is a more detailed illustration of the MIMS SOHO digital machine Internet Center Manager display views depicting the Web Site, Service Provider, and Search Manager View option choices.

FIG. 8 shows the Internet center mode 582 selection view which appears if 580 is selected from display 505. The selection view 582 has three additional Internet functions managers views that can be selected. These additional views are 583 for the website functions management, 587 for the service provider functions management and 588 for the search engine functions management which are all part of the SOHO digital machine single Internet center mode 580. Upon selecting one of the three views 583, 587, or 588 from the menu 582 the actual predetermined functions that can be performed are available to the operator.

In the preferred embodiment, the web site manager view 583 allows the operator to select the Web site to build, modify or visit using 583*a* and 583*b*. 583*a* requires the operator to either select "new" or enter a URL before selecting 583*b* will cause one of the predetermined function programs to operate. The new or established Website selected will be displayed on the display 10 as indicated by 583*d*. Web sites can be saved or opened using 583*h* or 583*g* along with 583*f*. Also 583*g* can be used to open other files along with the select 583*f* function in the same manner as described in connection with FIGS. 6 and 7 and the save function 583*h* is also used in a similar fashion as the earlier descriptions. The print function 583*e* causes the print manager view 545 to appear and can be operated as described in connection with FIG. 6. To cancel the view click on 583*c*.

In the preferred embodiment, the Service provider manager view 587 allows the operator to select the service providers used for the various websites the operator has access and authorization to visit or obtain service for the digital machine. In many cases this will be determined by the client/server system the MIMS 1 is connected as described in more detail in connection with the network digital machine. Using 587*a* and 587*b* automatically connects the digital machine to the service provider selected and automatically selects the preferred browser for that service provider. 587*g* allows a set of service providers to be opened if one knows the account and password information and 587*h* allows a service provider to be saved along with the security information required to be connected. The print function 587*e* causes the print manager view 545 to appear and can be operated as described in connection with FIG. 6. To cancel the view click on 587*c*.

In the preferred embodiment the Search manager view 588 allows the operator to select predetermined types of search such as a single engine search or a multiple engine search that is available with the service provider selected on view 587. The information can be saved using 588*g* and 588*h*. The print function 587*e* causes the print manager view 545 to appear and can be operated as described in connection with FIG. 6. To cancel the view click on 588*c*.

In FIG. 9 the digital machine manager View for the Network digital machine 52 is shown as 502, the view for the TV digital machine 53 is 503, and the PC digital machine 54 view is 504. Each of the three digital machine manager views are similar in design and functional purpose to the SOHO digital machine manager view 505 shown in FIG. 4 and shown again in FIG. 9 to emphasize the distinction between a multiple digital machine apparatus where each digital machine has multiple function subgroups like disclosed in this invention versus a prior art apparatus that is a multiple function single digital machine device or a prior art apparatus sometimes referred to as an "All In One" device. Each of the views in FIG. 9 show the subgroup functions available for each of the four digital machines 51, 52, 53, and 54. Each of the views 502, 503, 504 or 505 will be produced from the selector switch 50 as described to select the SOHO digital machine with the aid of FIG. 4. Also, for each digital machine selected the detailed subgroup function mode views could be described in the same manner used to describe the four SOHO digital machine subgroup mode multiple function views with the aid of FIGS. 5-8.

However, since each of the subgroup mode views 505, 502, 503 and 504 for each of the digital machines 51, 52, 53, and 54 in FIG. 9 use the same procedures as described previously for selecting each subgroup functions view for each digital machine in this four digital machine apparatus these steps will not be repeated. Instead, the key subgroup functions for each of the 502 subgroup functions 502*a* and 502*b*, 503 subgroup functions 503*a*, and 503*b* and 504 subgroup functions 504*a* and 504*b* will be discussed in terms of basic multiple function capability for each of the three digital machines.

The Network Digital machine 52 has two subgroup function selections as shown in the digital machine subgroup functions view 502 of FIG. 9. The 502*a* subgroup of functions referred to as the client/server center produce a selection view for the client and a selection view for the server (two subgroup functions selection menus). The client view (not shown) associated with 502*a* controls the functions involved in connecting the operators digital machine to a server network and allows the client to share resources including the multiple digital machines available in the particular MIMS connected to the network. For example the client can share their SOHO digital machine or just parts of the SOHO digital machine such as the Storage center functions and the document center functions. The server view (not shown) associated with 502*a* shows the client what other resources and MIMS digital machines and subgroup functions on the network are available the clients MIMS network digital machine. For example the Server view functions would allow connection to the company Internet service provider or the company Intranet server and provide a list of available Applications that can be run when the client selects the MIMS PC digital machine. Note that only two multiple function views were associated with the client/server center where as three views (515,525, and 535) were associated with the message center multiple subgroup functions discussed in connection with FIG. 5. The 502*b* subgroup of functions referred to as the home center produce a selection view for connecting the digital machine to home networks and a selection view for the connecting home appliance devices (two subgroup functions selection menus). The home networks view (not shown) associated with 502*b* controls the functions involved in connecting the digital machine to home network including wireless and allows the operator to share resources including the multiple digital machines available in the particular MIMS connected to the network. For example the client can share their SOHO digital machine or just parts of the SOHO digital machine such as the Storage center functions and the document center functions to other household users with computer digital machines. The Appliances view (not shown) associated with 502*b* allows the operator to connect other resources on the home network. For example the appliances view functions would allow connection to a wireless keyboard for keyboard 60 in FIG. 1 and for selecting the home TV as the display so that the operator could watch TV while surfing the net. Note that only two multiple function views were also associated with the 502*b* center whereas three views (515, 525, and 535) were associated with the message center multiple subgroup functions discussed in connection with FIG. 5.

The TV Digital machine 53 has two subgroup function selections as shown in the digital machine subgroup functions view 503 of FIG. 9. The 503*a* subgroup of functions referred to as the TV center produce a single selection view for selecting TV connections (one subgroup functions selection menu). The TV connection view (not shown) associated with 503*a* controls the functions involved in connecting the operators digital machine to a cable, antenna, or satellite system and allows the operator to select Web TV operation and connect through the phone or cable (if cable Web TV connection is available) Also this view allows the operator to connect the TV system to the SOHO digital machine Storage center for recording TV shows and programming recording channels and recording times. Note that only one multiple subgroup functions view was associated with the TV center (two would be logical one for connections and one for recording but one was used to emphasize the flexibility offered the manufacture) where as three views (515,525, and 535) were associated with the message center multiple subgroup functions discussed in connection with FIG. 5. The 503*b* subgroup of functions referred to as the sound center produce a selection view for connecting the digital machine to home audio equipment (a one subgroup functions selection menu). The sound center view (not shown) associated with 503*b* controls the functions involved in connecting the digital machine to audio and radio equipment and selecting the recording capabilities associated with each one. For example the operator can record music from a home entertainment center to a SOHO Storage center device. Note that only one multiple subgroup functions view was associated with the sound center (two would be logical one for connections and one for recording but one was used to emphasize the flexibility offered the manufacture) where as three views (515,525, and 535) were associated with the message center multiple subgroup functions discussed in connection with FIG. 5.

The PC Digital machine 54 has multiple PC digital machine program functions and wherein the subgroup function control unit 504 selects for use one or more of the PC digital machine program functions as shown in the subgroup function control unit 504 of FIG. 9. The term "PC digital machine program functions" as utilized herein means any program or group of programs which is capable of being run on a personal computer, including operating system software, application programs and combinations thereof. For example, one PC digital machine program function can be an operating system such as Linux or Windows 98, another PC digital machine program function can be a word processing software, such as Microsoft Word, and yet another PC digital machine program function can be a database program such as Microsoft Access.

The 504*a* subgroup of functions referred to as the Computer center produce a single selection view for selecting computers and computer configurations (one subgroup functions selection menu). The computer view (not shown) associated with 504*a* controls the functions involved in connecting the operators digital machine to the computer selected for operation when the PC digital machine 54 is selected and allows the operator to select the GUI configuration for the selected computer.

For example the MIMS designer might have incorporated four computer systems (operating systems) into the PC digital machine 54 so that the PC digital machine 54 can operate as an apple compatible computer, an IBM compatible computer, a Network computer or as a split PC computer like developed in co-pending applications that only require a Local keyboard and display for operation in one version and a Web TV in the other version. Note that only one multiple subgroup functions view was associated with the Computer center (two would be logical one for computer selection and one for computer configuration but one was used to emphasize the flexibility offered the manufacture) where as three views (515,525, and 535) were associated with the message center multiple subgroup functions discussed in connection with FIG. 5.

The 504*b* subgroup of functions referred to as the Application Service Provider (ASP) center produce a selection view for selecting and loading the application programs to be run on the computer (a one subgroup functions selection menu). The ASP center view (not shown) associated with 504*b* controls the functions involved in loading new programs on to the digital machine or upgrading software programs already on the digital machine. For example the operator can load a new program onto the disk drive portion predetermined by the manufacture to be allocated to the PC digital machine selected in the 504*a* view.

Note that only one multiple subgroup functions view was associated with the ASP center (two would be logical: one for connections; and one for recording but one was used to emphasize the flexibility offered the manufacturer) whereas three views (515, 525, and 535) were associated with the message center multiple subgroup functions discussed in connection with FIG. 5.

The number of subgroup functions views associated with each digital machine multifunction center depends on the apparatus designer but good designs will keep the multiple functions grouped for logical convenience to the operator like the single multiple function digital machines that perform fax, copying and scanning functions or the 3 in one storage disk drives that have recently appeared. For example just the SOHO digital machine alone in this disclosure put four single multiple functions digital machines (the message center, the document center, the storage center, and the internet center) in one housing. The prior art has the message center in at least one housing, the document centers are in at least one housing, the internet center has not yet been put in one housing separate from a PC or client/server system (there are some recent non PC devices allowing access to the internet but they are not multiple function subgroup devices shown at the Comdex 99 fall convention) and their still is not a storage center multiple function digital machine in a housing separate from a PC digital machine other than those used with computer systems.

Considering that three other digital machines were also incorporated into the same housing as the SOHO each of the other three digital machines having multiple subgroup functions gives some idea of what Multiple Integrated Digital machine Systems (MIMS) can do to reduce the proliferation of digital machines with only one set of multiple functions.

The MIMS 1 hereinbefore described depicts only one combination of digital machines 2. However, it should be understood that the combination of digital machines 2 can be varied to achieve different functions, purposes and objectives. For example, a kiosk MIMS 1a, a mobile MIMS 1b and a hospitality MIMS 1c are diagrammatically shown in FIGS. 10, 11 and 12 that were designed using the same methods as the MIMS 1 described using FIGS. 1-9.

Figure 10:
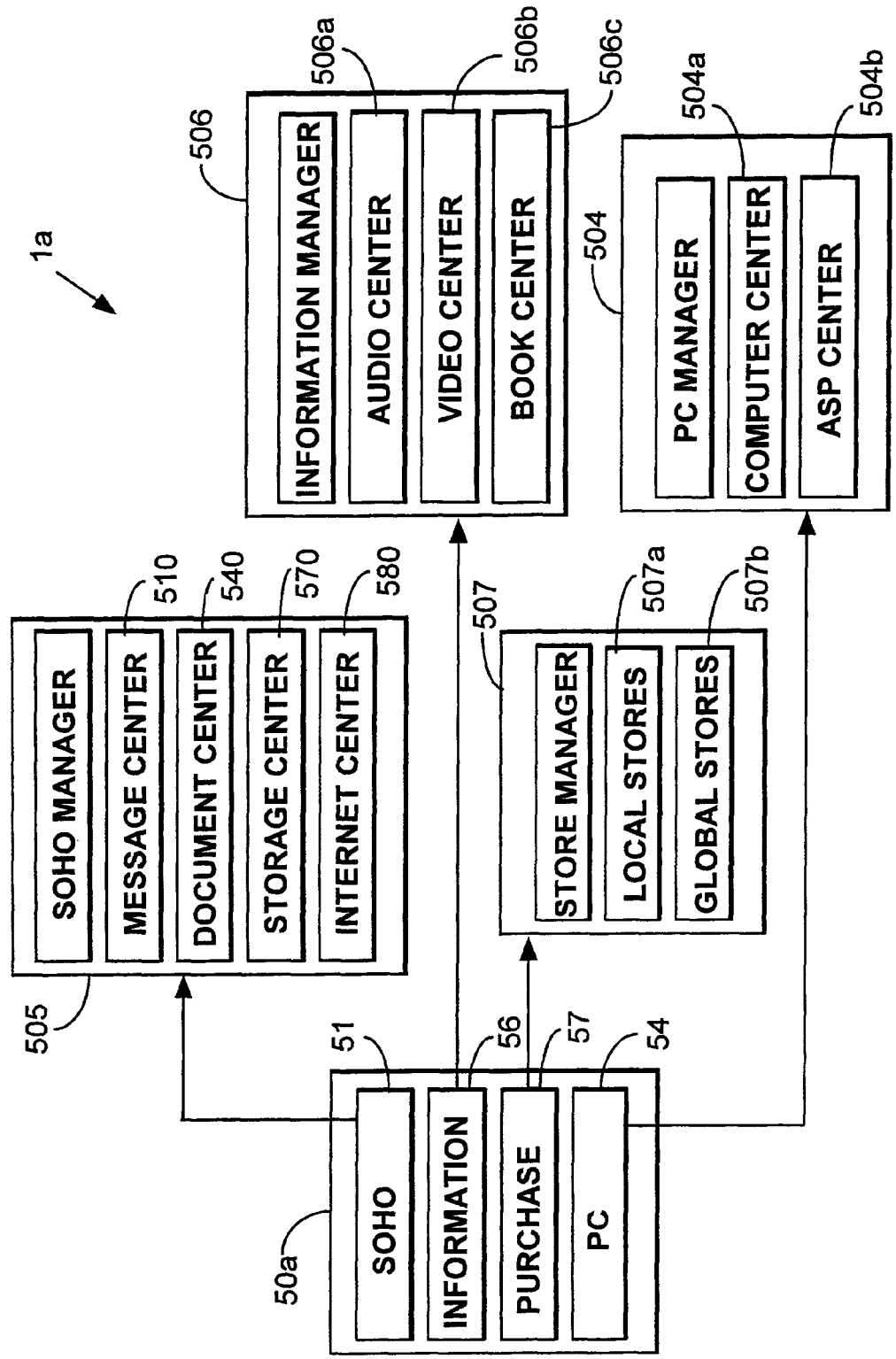
FIG. 10 is a block diagram of a kiosk MIMS, which is constructed in accordance with the present invention.

FIG. 10 diagrammatically illustrates the kiosk MIMS 1a that also has four selectable digital machines as indicated in a digital machine selector switch 50a. The kiosk MIMS 1a is similar in construction and function to the MIMS 1, which was hereinbefore described with reference to FIGS. 1-9, except as discussed hereinafter. The network digital machine 52 and the TV digital machine 53 have been removed from the MIMS 1, and a digital information manufacturing machine 56, and a digital purchase machine 57 have been substituted therefor. The digital information manufacturing machine 56 and the digital purchase machine 57 are commercial digital machines with hardware and software elements similar but some what different than those used in the network digital machine 52 and the TV digital machine 53 depicted in FIG. 9.

The digital information manufacturing machine 56 has three sets of hardware and software elements as shown in 506 to manufacture products from information reproduced in material objects provided at the point of sale location as controlled by the selection functions available with views 506a for audio information manufacturing onto a material object (using commercial grade audio storage devices for example) at the point of sale, and as controlled by the selection functions available with views 506b for video information manufacturing onto a material object (using the commercial grade video storage devices for example) at the point of sale, and as controlled by the selection functions available with views 506c for written information manufacturing onto a material object (using the commercial grade printing devices for example) at the point of sale. The digital information manufacturing machine 56 can be constructed and operated in a manner similar as the devices disclosed in U.S. Pat. Nos. 5,909,638 and 4,528,643. The entire content of U.S. Pat. Nos. 5,909,638 and 4,528,643 is hereby expressly incorporated herein by reference.

The digital purchase machine 57 has two sets of hardware and software elements as shown in 507 to order physically deliverable products (those that can not be manufactured at the point of sale) at the point of demand as controlled by the selection functions available with views 507a for products that can be ordered and paid for at local stores and subsequently delivered to the location designated by the purchaser or picked up at a later time such as tickets to a play or a pass to a theme park or merchandise from a local store for example and by the selection functions available with views 507b for products that can be ordered and paid for at global stores and subsequently delivered to the location designated by the purchaser such as merchandise ordered from a virtual store or foreign country.

The other two machines 51 and 54 of the Kiosk MIMS 50a shown in FIG. 10 are the same digital machines as 505 and 504 of the MIMS 1 described in connection with FIG. 9 although commercial grade elements would be used so the Kiosk MIMS 50a could be placed in a store, mall or airport and collect revenues from each of the digital machines selected by the consumer. The revenues can be collected by the kiosk MIMS 50a by including a digital machine element, such as a keypad or other device (such as a credit card swipe machine) in the kiosk MIMS 50a to receive the consumer's credit card number. The revenues can be charged on either a time or a per transaction basis.

The amount of revenue would depend both on the machine selected by the consumer and the function service selected from the machine. For example the cost to use the commercial SOHO digital machine would most likely depend on which of the four multiple functions 510, 540, 570 or 580 was selected while the cost to use the information manufacturing machine would most likely depend on the product selected for manufacture, for example.

Figure 11:
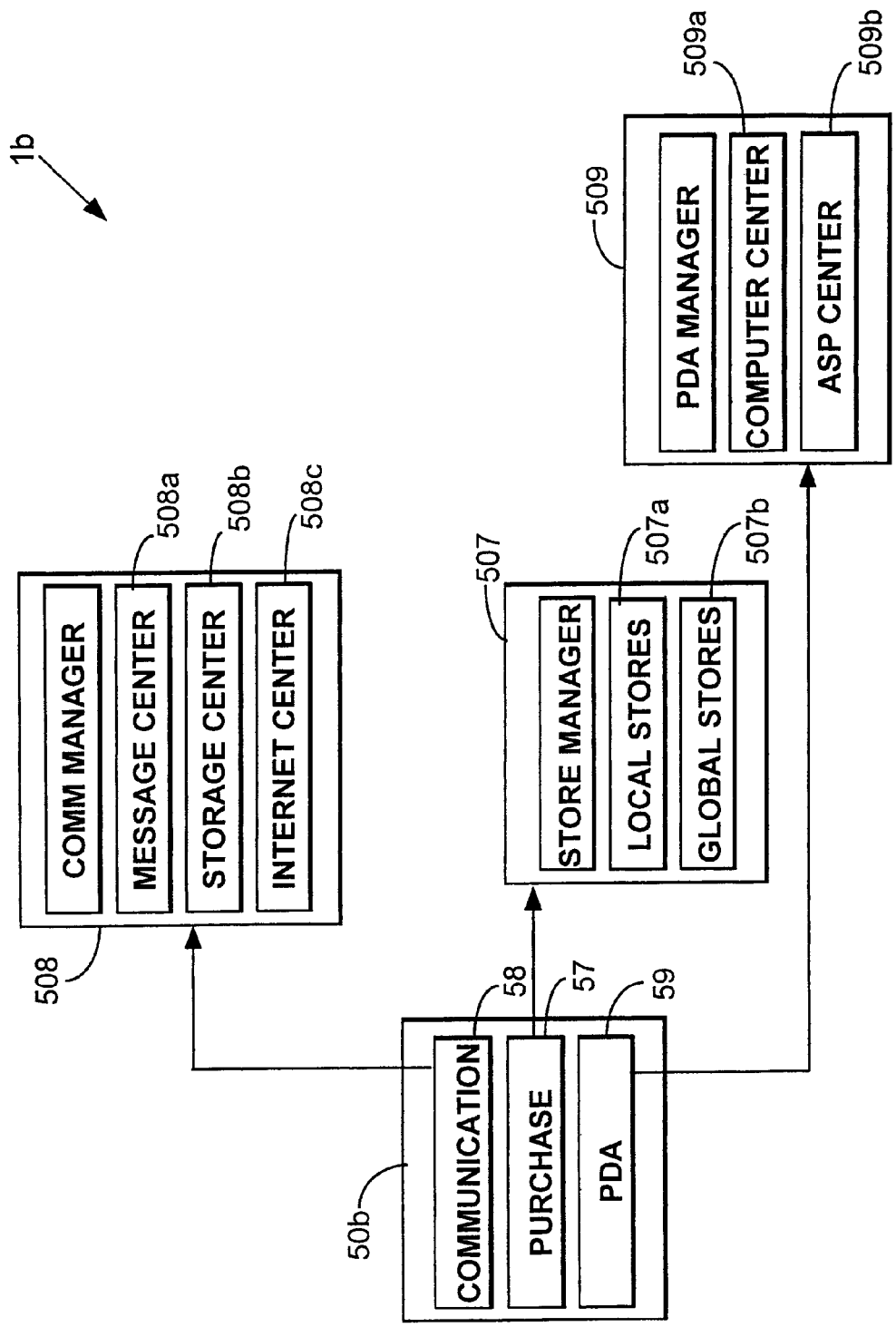
FIG. 11 is a block diagram of a mobile MIMS, which is constructed in accordance with the present invention.

As yet another example, shown in FIG. 11 is the mobile MIMS 1b that only has three selectable digital machines as indicated in 50b and all three of the digital machines 57, 58 and 59 have hardware and software elements similar in function to the machines discussed in connection with FIG. 10 but most of the elements are very much smaller than those used in the machines of FIG. 10 and the subgroup views offer fewer selectable and much lower power functions.

For example the 508 and 509 selections in FIG. 11 are very much smaller machines than their cousins 505 and 504 shown in FIG. 10. The reason is because the Kiosk MIMS 1a is a commercial and stationary system and can take up several cubic feet of space and use several hundred watts of power if necessary where as the Mobile MIMS 1b of FIG. 11 is portable and has to be put into a housing measured in cubic inches and use power per function measured in milliwatts or microwatts such as used in the digital cellphones, pagers or PDA's.

Consequently, in one preferred embodiment, the message center 508a for example only provides those phone/pager center functions currently available on a Nokia 8860 phone and Motorola Pagewriter 2000 pager plus. The mobile MIMS 1b is also provided with a storage unit 508b, which in one preferred embodiment can be constructed in a similar manner as a storage unit included in the Ericsson T18d smart card device size or Handspring PDA unit with on board recording, or in the Samsung 8500 digital Cell phone.

The Internet center 508c, in one preferred embodiment, only allows e-mail functions like are incorporated in the digital phones scheduled for the year 2000 plus the Internet down load services currently available.

The same sort of scale down is down from the PC digital machine 54 to the PDA machine 59 both the size and power (Desk top display and key board PC computer versus Palm VII PDA capacity) as well as the number of functions available are greatly reduced. But again the PDA machine 59 (which includes a computer machine) can be selected by the user, a communication machine 58 can be selected by the user and a Purchase machine 507 can be selected by the user that will change the Mobile MIMS 1b into three distinct machines with distinct functions.

Comparing this scaled down capacity with the MIMS SOHO message center services shows that although many of the same functions are available in the Mobile MIMS message center they are scaled back. This fact does not change the fact that in the Mobile MIMS many different stand alone Mobile machines can be combined into a single housing in the manner described in this application. Consequently the Mobile MIMS 1b allows the user to "Morph" on demand the Mobile MIMS 1b into one of several multiple function digital machines.

Figure 12:
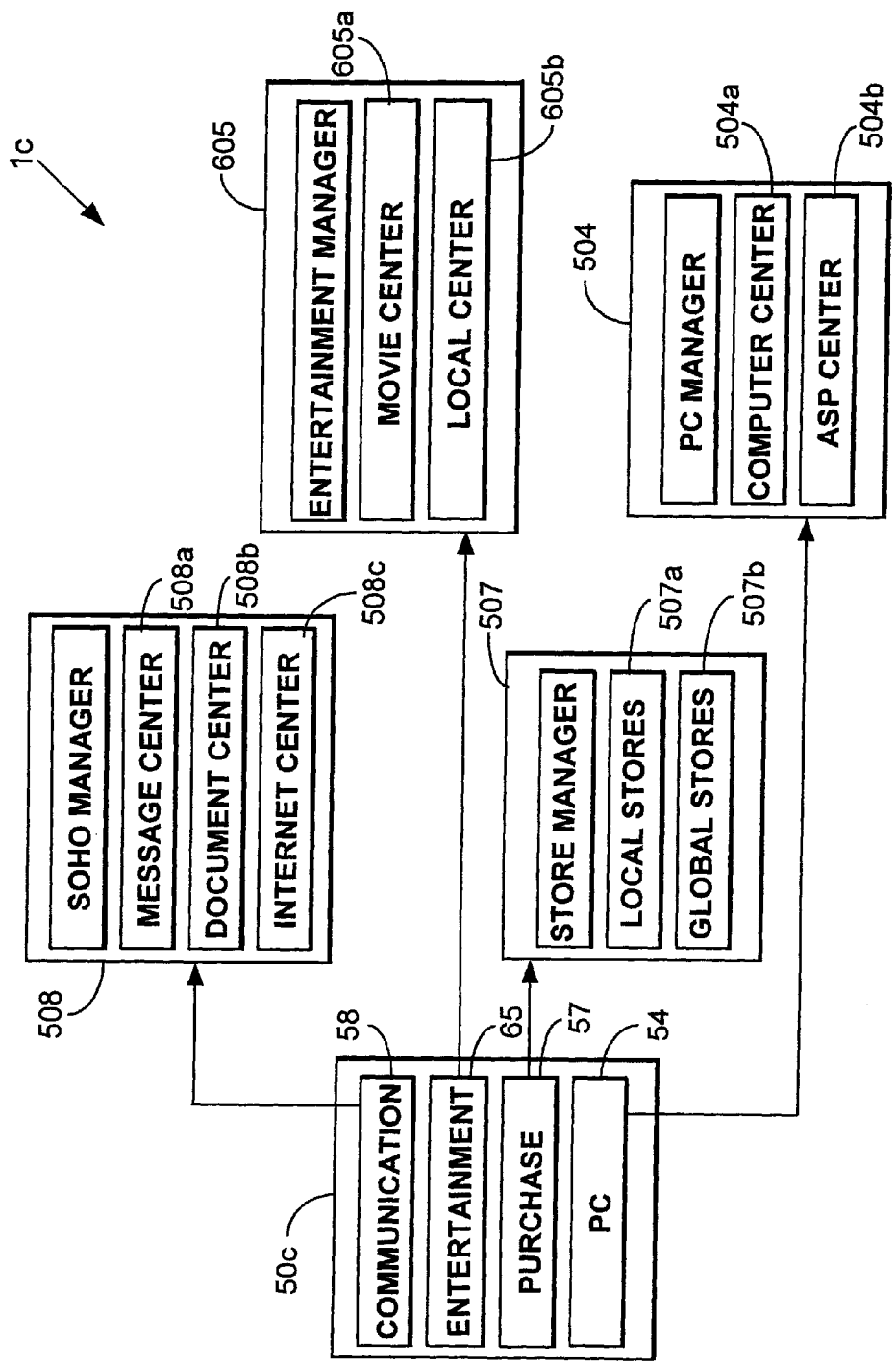
FIG. 12 is a block diagram of a hospitality MIMS, which is constructed in accordance with the present invention.

As yet another example, shown in FIG. 12 is the hospitality MIMS 1c that also has four selectable digital machines as indicated in a digital machine selector switch 50c. The functions for three of the digital machines 54, 57 and 58 in the hospitality MIMS 1c have already been discussed herein with reference to one or more of the digital machines in FIG. 9, 10 or 11 and will not be repeated again for purposes of clarity. The hospitality MIMS 1c is further provided with an entertainment digital machine 65 to allow the existing services such as "pay per View movies" and interactive games to be included into the same housing as other services soon to be demanded by hotel and convention patrons that are willing to pay for such services.

Integrating the four machines into the common housing and operated by a wireless keyboard is the preferred embodiment for the 54, 57, 58 and 65 machines. With the Hospitality MIMS 1c, guests can purchase tickets to events and select their seats from the purchase machine 57. Guests can also order movies or play games from the entertainment machine 65. The communication machine 58 permits the guests to send or receive e-mail and documents along with typing and sending letters. Furthermore, the guests can use or work on the PC digital machine 54 the same as they have at home or use their own PC if they are renting one from a service provider (See co-pending patent application Ser. Nos. 09/014, 859, entitled "split personal computer system" and 09/408, 598, entitled "A Multiple Customer and Multiple Location PC Service Provider System" the entire content of both patent applications being hereby incorporated herein by reference).

The hotel will charge for each and all of these services and the guests will be more than glad to pay for the convenience of having all these services available in the room accessible from an easy to use wireless keyboard with a four machine selection menu provided by the hospitality MIMS 1c.

Changes may be made in the various elements, components, parts and assemblies described herein or in the steps or sequences of steps in the methods described herein without departing from the spirit and the scope of the invention as defined in the following claims.

What is claimed is:

1. A mobile multiple integrated machine system capable of performing as at least a communication machine and an entertainment machine, the mobile multiple integrated machine system comprising:
   a plurality of digital machine elements controlled by the same operating system software, each of the digital machine elements including hardware portions and software portions and at least a portion of the digital machine elements being capable of performing as part of at least one of the communication machine and the entertainment machine;
   a digital machine element grouping control unit automatically connecting predetermined digital machine elements in a first combination to form the communication machine whereby the digital machine elements forming the communication machine are capable of performing one or more functions of the communication machine, and automatically connecting predetermined digital machine elements in a second combination to form the entertainment machine upon receipt of a second digital machine selection the entertainment machine whereby the digital machine elements forming the entertainment are capable of performing one or more functions of the entertainment machine;
   a first subgroup function control unit associated with the communication machine for selecting for use one or more of the functions to be performed by the communication machine; and
   a second subgroup function control unit associated with the entertainment machine for selecting for use one or more function modes to be performed by the entertainment machine.

2. The mobile multiple integrated machine system of claim 1, wherein the same operating system software is defined further as Linux operating system software.

3. The mobile multiple integrated machine system of claim 1, wherein the same operating system software is defined further as Windows NT operating system software.

4. The mobile multiple integrated machine system of claim 1, wherein the entertainment machine includes an operating system software running thereon, the operating system software running on the entertainment machine being different from the operating system software controlling each of the digital machine elements.

5. The mobile multiple integrated machine system of claim 1, wherein the communication machine is defined further as a cellphone.

6. The mobile multiple integrated machine system of claim 1, wherein the communication machine includes a message center.

7. The mobile multiple integrated machine system of claim 1, wherein the entertainment machine is adapted to receive video signals.

8. The mobile multiple integrated machine system of claim 1, wherein the entertainment machine is adapted to receive interactive games.

* * * * *